United States Patent
Chen et al.

(10) Patent No.: US 10,158,876 B2
(45) Date of Patent: Dec. 18, 2018

(54) BACKWARD VIEW SYNTHESIS PREDICTION

(71) Applicant: QUALCOMM Incorporated, San Diego, CA (US)

(72) Inventors: Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 14/247,928

(22) Filed: Apr. 8, 2014

(65) Prior Publication Data

US 2014/0307795 A1 Oct. 16, 2014

Related U.S. Application Data

(60) Provisional application No. 61/810,674, filed on Apr. 10, 2013.

(51) Int. Cl.
*H04N 19/52* (2014.01)
*H04N 19/597* (2014.01)

(52) U.S. Cl.
CPC .......... *H04N 19/52* (2014.11); *H04N 19/597* (2014.11)

(58) Field of Classification Search
None
See application file for complete search history.

(56) References Cited

U.S. PATENT DOCUMENTS

| | | | | |
|---|---|---|---|---|
| 2013/0114742 | A1* | 5/2013 | Hannuksela | H04N 19/00533 375/240.25 |
| 2013/0156335 | A1* | 6/2013 | Lim | H04N 19/52 382/238 |
| 2013/0342644 | A1* | 12/2013 | Rusanovskyy | H04N 19/597 348/43 |
| 2014/0092968 | A1* | 4/2014 | Guillemot | H04N 19/597 375/240.14 |
| 2014/0098883 | A1* | 4/2014 | Hannuksela | H04N 19/597 375/240.16 |
| 2014/0301463 | A1* | 10/2014 | Rusanovskyy | H04N 19/52 375/240.14 |
| 2015/0245049 | A1* | 8/2015 | Lee | H04N 19/597 375/240.16 |
| 2015/0281729 | A1* | 10/2015 | Lin | H04N 19/174 375/240.16 |

OTHER PUBLICATIONS

Tian et al. "CE1.h: Backward View Synthesis Prediction using Neighbouring Blocks", JCT-3V Meeting; 1-3. MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16.*

(Continued)

*Primary Examiner* — William C Vaughn, Jr.
*Assistant Examiner* — Stuart D Bennett
(74) *Attorney, Agent, or Firm* — Shumaker & Sieffert, P.A.

(57) ABSTRACT

In one example, a device for coding video data includes a video coder configured to code motion information for a block of multiview video data, wherein the motion information includes a reference index that identifies a reference picture comprising a source for backward-warping view synthesis prediction (BVSP), perform BVSP on a portion of the reference picture to produce a BVSP reference block, and predict the block using the BVSP reference block.

47 Claims, 9 Drawing Sheets

(56) References Cited

OTHER PUBLICATIONS

Rusanovskyy D. et al., "3D-AVC Test Model 5", Joint Collaborative Team on 3D Video Coding Extension Development of ITU-T SG 16 WP 3 and ISP/IEC JTC 1/SC 29/WG 11, 3rd Meeting: Geneva, CH, JCT3V-C1003, Version 5, Mar. 28, 2013, pp. 20-21.*
Tian et al. "CE1.h: Backward View Synthesis Prediction using Neighbouring Blocks", JCT-3V Meeting; 1-3. MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16 (Year: 2013).*
Zhang, et al., "CE5.h: Disparity vector generation results", JCT2-A0097, JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, XP030130096, 5 pp.
Su et al., "3DV-CE1.A: Block-based View Synthesis Prediction for 3DV-ATM", JCT2-A0107, MPEG Meeting; Jul. 16-20, 2012; Stockholm; (Motion Picture Expert Group or ISO/IEC JTC1/SC29/WG11),, No. m26069, XP030054484, 5 pp.
Sung, et al., "3D-CE5.h: Simplification of disparity vector derivation for HEVC-based 3D video coding," Document: JCT2-A0126, MPEG Meeting, Jul. 16-20, 2012, 4 pp.
Kang, et al., "3D-CE5.h related: Improvements for disparity vector derivation", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-B0047, XP030130228, 4 pp.
Tech G., et al., "3D-HEVC Test Model 2," JCT3V-B1005_d0, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 126 Pages.
Tian D., et al.,"CE1.h: Backward View Synthesis Prediction using Neighbouring Blocks", 3. JCT-3V Meeting; 103. MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-00152,Jan. 10, 2013 (Jan. 10, 2013), XP030130568, p. 5.
Hannuksela M.M., et al., "3D-AVC Draft Text 5," JCT3V-C1002, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 82 Pages.
Tech G., et al., "3D-HEVC Test Model 3", 3. JCT-3V Meeting; 103. MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-C1005, Mar. 15, 2013 (Mar. 15, 2013), 52 Pages, XP030130664, the whole document.
Tech et al., "3D-HEVC Test Model 3," Joint Collaborative Team on 3D Video Coding Extension Development of ITU-T SG 16 WP 3 and ISO/IEC JTC 1/SC 29/WG 11, Document: JCT3V-C1005_spec_d1, Jan. 17-23, 2013, 91 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Hannuksela, et al., "3D-AVC Test Model 4", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16 ); URL: http://phenix.int-evry.fr/jct2/,,No. JCT3V-B1003, XP030130412, 25 pp.
Tian, et al.,"CE1.h: Backward View Synthesis Prediction using Neighbouring Blocks ", JCT-3V Meeting; MPEG Meeting; Jul. 16-20, 2012; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-00152, XP030130568, 5 pp.
International Search Report and Written Opinion from International Application No. PCT/US2014/033522, dated Jul. 21, 2014, 14 pp.
Response to Written Opinion dated Jul. 21, 2014 from International Application No. PCT/US2014/033522, filed on Nov. 21, 2014, 6 pp.
Second Written Opinion from International Application No. PCT/US2014/033522, dated Apr. 30, 2015, 10 pp.
Response to Second Written Opinion dated Apr. 30, 2015 from International Application No. PCT/US2014/033522, filed on May 29, 2015, 23 pp.
International Preliminary Report on Patentability from International Application No. PCT/US2014/033522, dated Apr. 30, 2015, 10 pp.
Rusanovskyy D., et al., "3D-AVC Test Model 5", Joint Collaborative Team on 3D Video Coding Extension Development of ITU-T SG 16 WP 3 and ISO/IEC JTC 1/SC 29/WG 11, 3rd Meeting: Geneva, CH, JCT3V-C1003, Version 5, Mar. 28, 2013, pp. 20-21.

* cited by examiner

BACKWARD VIEW SYNTHESIS PREDICTION

This application claims the benefit of U.S. Provisional Application Ser. No. 61/810,674, filed Apr. 10, 2013, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for performing backward view synthesis prediction (BVSP), also referred to as block-based view synthesis prediction in some instances. A block may be coded using BVSP mode by determining a disparity vector for a neighboring block, identifying a depth block in a depth picture identified by the disparity vector relative to the block, and using depth pixels of the depth picture to warp texture pixels of a texture image corresponding to the depth picture to produce a BVSP reference block, also referred to herein as a predicted block. The block may further include motion information including a reference index that identifies the texture picture from which the BVSP reference block is to be produced. The video coder may then code the BVSP block using the BVSP reference block as a predicted block.

In one example, a method includes decoding motion information for a block of multiview video data, wherein the motion information includes a reference index that identifies a reference picture comprising a source for backward-warping view synthesis prediction (BVSP), performing BVSP on a portion of the reference picture to produce a BVSP reference block, and predicting the block using the BVSP reference block.

In another example, a method includes encoding motion information for a block of multiview video data, wherein the motion information includes a reference index that identifies a reference picture comprising a source for backward-warping view synthesis prediction (BVSP), performing BVSP on a portion of the reference picture to produce a BVSP reference block, and predicting the block using the BVSP reference block.

In another example, a device includes a video coder configured to code motion information for a block of multiview video data, wherein the motion information includes a reference index that identifies a reference picture comprising a source for backward-warping view synthesis prediction (BVSP), perform BVSP on a portion of the reference picture to produce a BVSP reference block, and predict the block using the BVSP reference block.

In another example, a device includes means for coding motion information for a block of multiview video data, wherein the motion information includes a reference index that identifies a reference picture comprising a source for backward-warping view synthesis prediction (BVSP), means for performing BVSP on a portion of the reference picture to produce a BVSP reference block, and means for predicting the block using the BVSP reference block.

In another example, a computer-readable storage medium has stored thereon (e.g., is encoded with) instructions that, when executed, cause a processor to code motion information for a block of multiview video data, wherein the motion information includes a reference index that identifies a reference picture comprising a source for backward-warping view synthesis prediction (BVSP), perform BVSP on a portion of the reference picture to produce a BVSP reference block, and predict the block using the BVSP reference block.

The details of one or more examples are set forth in the accompanying drawings and the description below. Other features, objects, and advantages will be apparent from the description and drawings, and from the claims.

DETAILED DESCRIPTION

Figure 1:
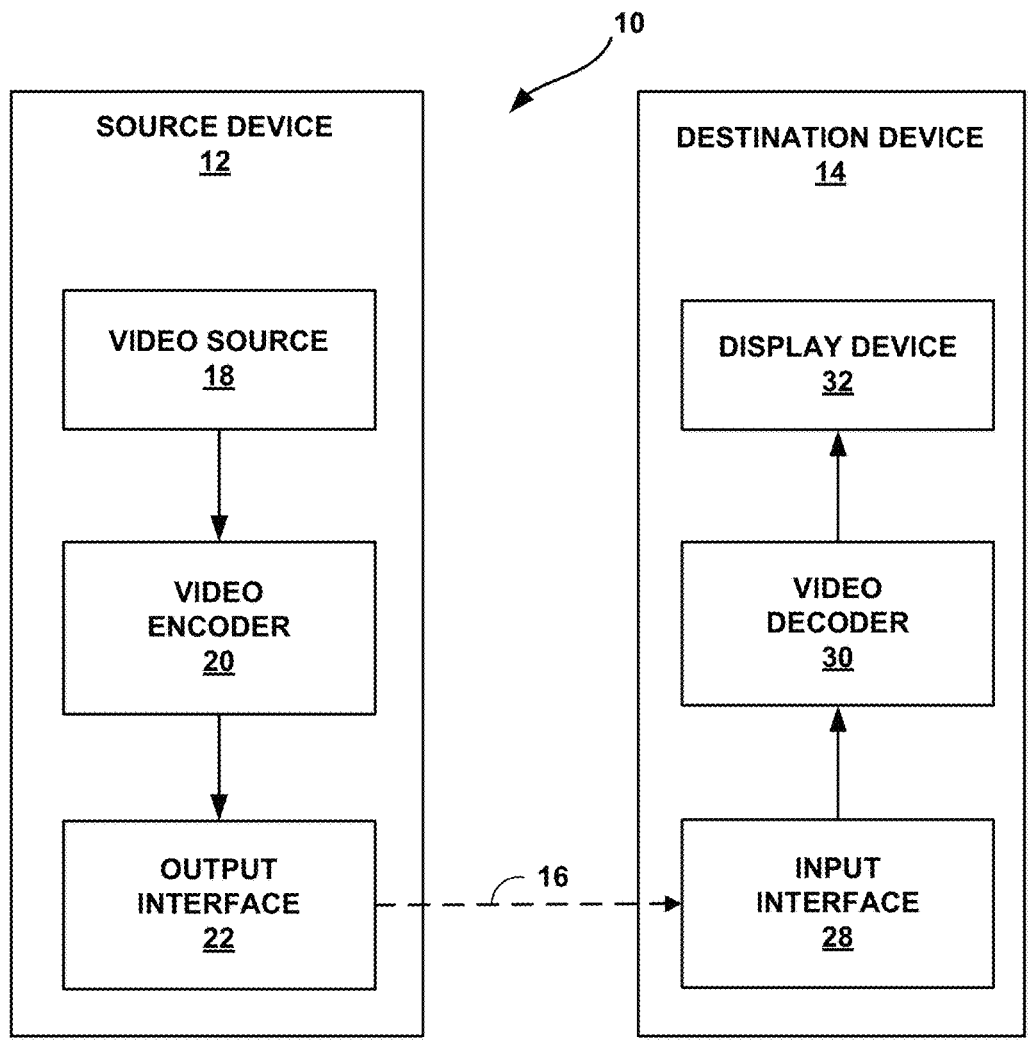
FIG. 1 is a block diagram illustrating an example video encoding and decoding system that may utilize techniques for coding blocks using backward view synthesis prediction (BVSP).

The techniques of this disclosure are generally related to multiview video coding based on advanced codecs. One example of such advanced codecs is a codec configured to operate according to the three-dimensional (3D) extension to the High Efficiency Video Coding (HEVC) standard. HEVC, also referred to as ITU-T H.265, is described in ITU-T H.265, SERIES H: AUDIOVISUAL AND MULTIMEDIA SYSTEMS, Infrastructure of Audiovisual Services—Coding of Moving Video, High Efficiency Video Coding, April 2013, available at http://www.itu.int/ITU-T/recommendations/rec.aspx?rec=11885. 3D-HEVC is described in Gerhard Tech, Krzysztof Wegner, Ying Chen, & Sehoon Yea, "3D-HEVC Test Model Description draft 2," JCT3V-B1005, Joint Collaborative Team on 3D Video Coding Extension Development of ITU-T SG 16 WP 3 and ISO/IEC JTC 1/SC 29/WG 11, 2nd Meeting: Sanghai, CN, October 2012.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A joint draft of MVC is described in "Advanced video coding for generic audiovisual services," ITU-T Recommendation H.264, March 2010. The techniques of this disclosure are generally described with respect to HEVC and extensions thereof (e.g., a 3D or multiview video coding extension). However, it should be understood that the techniques of this disclosure may be applied to other video coding standards and extensions to such standards.

For instance, the techniques of this disclosure may be applied to ITU-T H.264/AVC or an extension thereof. In H.264/AVC, each inter Macroblock (MB) may be partitioned in one of four different ways: one 16×16 pixel MB partition, two 16×8 pixel MB partitions, two 8×16 pixel MB partitions, or four 8×8 pixel MB partitions. Different MB partitions in one MB may have different reference index values for each prediction direction (i.e., RefPicList0 or RefPicList1). When an MB is not partitioned into four 8×8 MB partitions, it may have only one motion vector for the whole MB partition in each direction, as prescribed by the H.264 video coding standard.

When an MB is partitioned into four 8×8 pixel MB partitions, each 8×8 pixel MB partition can be further partitioned into sub-blocks. There are four different ways to get sub-blocks from an 8×8 pixel MB partition: one 8×8 pixel sub-block, two 8×4 pixel sub-blocks, two 4×8 pixel sub-blocks, and four pixel 4×4 sub-blocks. Each sub-block can have a different motion vector in each direction. How an 8×8 MB partition is partitioned into sub-clocks are named sub-block partition.

Currently, a Joint Collaboration Team on 3D Video Coding (JCT-3V) of VCEG and MPEG is developing a 3DV standard based on H.264/AVC, i.e., 3D-AVC. For 3D-AVC, new coding tools besides the inter-view prediction in MVC have been included and supported. 3D-ATM version 6.2 software for 3D-AVC can be downloaded from the following link: http://mpeg3dv.research.nokia.com/svn/mpeg3dv/tags/3DV-ATMv6.2. An AVC-based 3D video (3D-AVC) coding standard is currently under development by JCT-3V, and a version of 3D-AVC is described in M. M. Hannuksela, Y. Chen, T. Suzuki, J.-R. Ohm, G. J. Sullivan, "3D-AVC draft text 5," JCT3V-C1002, Geneva, CH, January, 2013, available at http://phenix.it-sudparis.eu/jct2/doc_end_user/documents/3_Geneva/wg11/JCT3V-C1002-v3.zip.

3D-AVC is compatible with H.264/AVC in a way that the texture part of the base view is fully decodable by an H.264/AVC decoder. For enhanced view components in 3D-AVC, the depth may be coded prior to the texture and a texture view component may be coded based on the information from the depth view component, which is also referred to as depth-first coding. By contrast, each texture view component may be coded before the respective depth view components in texture-first coding order.

Examples of the coding orders of the texture and depth view components in 3D-AVC are explained as follows, where T0 and D0, respectively, refer to the texture and depth view components of the base view, and Ti and Di, respectively, refer to the texture and depth view components of the i-th dependent view. In these examples, three views (0, 1, and 2) are considered, and it is assumed that the view components are coded in order as stated below from left to right:

T0 D0 D1 D2 T1 T2—In this example, the base views (T0 and D0) are coded with the texture-first coding order while the dependent view is coded with the depth-first coding order. The hybrid coding order is used in common test conditions of 3D-AVC.

T0 D0 T1 D1 T2 D2—In this example, all the view components are coded with the texture-first coding order.

If inter-view prediction is enabled for Ti, a reference texture view for view Ti may be defined as the view which includes a corresponding inter-view reference picture for a picture in view Ti, and the corresponding depth view may be defined as the reference depth view that has the same view order index as that of the reference texture view. For example, if a texture picture in Ti were predicted relative to a reference picture in view Tk, Tk would be labeled the reference texture view and Dk would be labeled the reference depth view, according to the example definitions above.

Techniques are described below, e.g., with respect to FIGS. 4-7, related to performing backward view synthesis prediction (BVSP). In general, BVSP involves deriving a disparity vector from a neighboring block to a current block in a texture picture, identifying a depth block in a depth view using the disparity vector, and using the disparity vector to identify pixels of a reference texture image to use to synthesize a predicted block for the current block. The predicted block may also be referred to as a BVSP reference block. However, this disclosure recognizes certain problems that may arise when performing BVSP in accordance with the current techniques of 3D-HEVC.

This disclosure first recognizes that the prediction units coded with BVSP mode are predicted from an inter-view reference picture, while the reference index is set to −1. Such a design may have the following problems:

The design of 3D-HEVC is not aligned with HEVC in terms of the semantics of a reference index. A reference index equal to −1 typically indicates intra-mode prediction or no inter-prediction.

Several modules may need to be modified: whenever the checking of intra/inter mode is invoked, one more condition should be also checked, i.e., the BVSP mode flag equal to 1 or not.

For example, the design of deblocking filter, temporal merging candidate, Do-NBDV (Neighboring Block-based Disparity Vector Derivation), and advanced motion vector prediction (AMVP) may need modification.

The BVSP mode flag in 16×16 unit should be stored together with other motion information in decoded picture buffer. It may be used during the temporal merging candidate derivation process.

For motion parameter inheritance, the candidate derived from the co-located texture block is first derived. Afterward, a checking of whether the candidate in the co-located texture block is a BVSP merging candidate. If yes, motion parameter inheritance (MPI) is disabled for this block by using the BVSP merging candidate created for the current depth block. The replacement increases the complexity with coding loss.

The prediction direction is set to bi-prediction for a BVSP block in the software, whereas it is set to uni-prediction in the specification.

This disclosure proposes various modifications that may be applied to the BVSP techniques of 3D-HEVC, which may overcome these potential problems and/or introduce other advantages. The techniques of this disclosure may align modules in 3D-HEVC with basic HEVC modules when BVSP is enabled.

FIG. 1 is a block diagram illustrating an example video encoding and decoding system 10 that may utilize techniques for coding blocks using backward view synthesis prediction (BVSP). As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding blocks using backward view synthesis prediction (BVSP). In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding blocks using backward view synthesis prediction (BVSP) may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

This disclosure generally describes techniques related to backward view synthesis prediction, and in particular, techniques that may be used to overcome the problems discussed above. This disclosure proposes to remove all the additional checking of BVSP mode by replacing the reference index by the inter-view reference picture index after the merge candidate list is constructed. Therefore, there is no need to change modules of 3D-HEVC, e.g., deblocking filter, temporal merging candidate, Do-NBDV, and AMVP modules, and a video coder (e.g., video encoder 20 and/or video decoder 30) may store the BVSP mode flags in a decoded picture buffer (DPB) to reduce the complexity for a hardware implementation.

As discussed in greater detail below, in 3D-HEVC, when backward view synthesis prediction (BVSP) is used to code a block, motion information for the block includes a reference index equal to −1. In accordance with this disclosure, however, a video coder (such as video encoder 20 or video decoder 30) may code a block using BVSP where a reference index for the block refers to a picture from which view synthesis prediction is to be performed. In other words, this disclosure proposes that a block coded using BVSP mode is set to have a reference index equal to that of an inter-view reference picture in a reference picture list, where the inter-view reference picture is the picture from which view synthesis is performed.

In this manner, BVSP coded blocks can be, in many cases, considered transparently as normal, inter-predicted blocks. For instance, in AMVP, when accessing a neighboring block (including a spatial neighboring block) to create a motion vector predictor candidate, instead of having different logic functions for both BVSP coded blocks and normal inter predicted blocks, one function, as in HEVC, can be used for both BVSP coded blocks and inter predicted blocks. Likewise, in temporal motion vector prediction (TMVP), BVSP coded blocks and the normal inter coded blocks can be handled jointly in one function. In addition, BVSP variables do not need to be stored into a decoded picture buffer. Furthermore, in deblocking, additional logic that was added in 3D-HEVC to handle BVSP can be removed. Moreover, in NBDV, a neighboring block being a BVSP coded block and being a disparity motion compensated block are considered as the same; therefore, additional checking of the BVSP variable is not needed for each neighboring block. In this manner, implementing these techniques may reduce the complexity of a codec conforming to, e.g., 3D-HEVC as modified by these techniques.

This disclosure describes additional techniques related to setting a reference index for a block coded using BVSP. In particular, this disclosure describes techniques in which setting of the reference index for a block coded using BVSP happens right after the merge candidate list is created and a BVSP candidate has been inserted and/or chosen with the merge_idx. Alternatively, when the BVSP merge candidate is chosen, a video coder (such as video encoder 20 or video decoder 30) may convert the BVSP merge candidate immediately to a candidate for which the reference index is set to that of the inter-view reference picture from which the view synthesis is performed.

In some examples, a BVSP block may still be identified by the BVSP variable. However, although memory storage may be allocated for such a variable for a whole slice, the memory need not be allocated in a decoded picture buffer DPB, contrary to the techniques of 3D-HEVC for BVSP.

In addition, or in the alternative, motion parameter inheritance (MPI) may be enabled regardless of whether a co-located bock is coded with BVSP mode or not. Therefore, the storage of the BVSP variable is not needed once a slice is coded. Thus, instead of carrying the BVSP variable in memory until the coding of depth view component, video encoder 20 and video decoder 30 may discard the BVSP variable once the slice including the BVSP-coded block is coded.

Furthermore, a BVSP merging candidate may always be added at a relatively fixed position, regardless of whether a spatial neighboring block is coded with BVSP or not. This way, the storing of the BVSP variable (even in a slice or line buffer) is not needed. That is, video encoder 20 and video decoder 30 need not store the BVSP variable. In some examples, video encoder 20 and video decoder 30 may be configured to always insert a BVSP candidate into the ordinal first position in a merge candidate list. In some examples, video encoder 20 and video decoder 30 may be configured to insert the BVSP candidate in the merge candidate list after all spatial merge candidates. In some examples, video encoder 20 and video decoder 30 may be configured to insert the BVSP candidate in any (predetermined) position of the merge candidate list.

In this manner, video encoder 20 and video decoder 30 represent examples of a video coder configured to code (e.g., encode by video encoder 20 or decode by video decoder 30), e.g., in accordance with 3D-HEVC, motion information for a block of multiview video data, wherein the motion information includes a reference index that identifies a reference picture comprising a source for backward-warping view synthesis prediction (BVSP), perform BVSP on a portion of the reference picture to produce a BVSP reference block, and predict the block using the BVSP reference block.

In particular, as discussed above, video encoder 20 and video decoder 30 may be configured to code motion information for a block of multiview video data. The motion information may include a reference index, among other motion parameters (such as a reference picture list identifier). The reference index may have a value that identifies a reference picture in a reference picture list, as opposed to a value of −1 as described in 3D-HEVC for BVSP-coded blocks. However, rather than predicting the block from the reference picture identified by the reference index, video encoder 20 and video decoder 30 may be configured to perform BVSP on a portion of the reference picture to produce a BVSP reference block. That is, video encoder 20 and video decoder 30 may synthesize a predicted block for the block using BVSP from the reference picture identified by the reference index in the reference picture list. The predicted block may also be referred to as a BVSP reference block.

Video encoder 20 and video decoder 30 may use the BVSP reference block (acting as a predicted block) to code the block. For example, video encoder 20 may calculate pixel-by-pixel differences between the block and the predicted block to form a residual block. Video decoder 30 may reconstruct a residual block, by entropy decoding bitstream data, then inverse quantizing and inverse transforming this data, and then add, pixel-by-pixel, the predicted block to the residual block to reproduce the block.

It should be understood that when performing BVSP to synthesize the BVSP reference block, the BVSP reference block is considered to be in a different view than a current view including the block being coded as well as a view including the reference picture from which the BVSP reference block is synthesized. For instance, assuming that the current block is in view 2, the reference picture may be in view 0 and the BVSP reference block may be synthesized in view 1.

Furthermore, after the block has been coded using BVSP, motion information of the block may be used as a motion vector predictor. For example, video encoder 20 and video decoder 30 may be configured to access a neighboring block, coded using BVSP, as a first motion vector predictor candidate (e.g., for advanced motion vector prediction (AMVP)). Video encoder 20 and video decoder 30 may be configured with a particular logic function for accessing AMVP candidates. Rather than including two different logic functions, one for BVSP candidates and one for non-BVSP candidates, video encoder 20 and video decoder 30 may access both BVSP and non-BVSP candidates using the same logic function. Accordingly, video encoder 20 and video decoder 30 may access a BVSP-coded block as an AMVP candidate using the same logic function as that used to access a non-BVSP-coded block as a different AMVP candidate.

Similarly, motion information for a BVSP-coded block may be accessed as a candidate for temporal motion vector prediction (TMVP). Video encoder 20 and video decoder 30, when coding motion information for a current block using motion information of a BVSP-coded block, may access the motion information of the BVSP-coded block using a function that is also used to access motion information for inter-view predicted blocks. In other words, the same function used to access motion information for inter-view predicted blocks (e.g., disparity motion vectors) may also be used to access motion information for BVSP-coded blocks.

Moreover, video encoder 20 and video decoder 30 may use motion information of a BVSP-coded block when coding motion information of a current block using merge mode. In order to code motion information using merge mode, in some examples, video encoder 20 and video decoder 30 may create a merge candidate list including motion information for neighboring blocks, including spatial and/or temporal neighboring blocks, which may include a BVSP candidate. When video encoder 20 and/or video decoder 30 selects the BVSP candidate from the merge candidate list, the video coder may immediately set a value for a reference index of a block for which motion information is being coded using the BVSP candidate in merge mode (rather than waiting until a later time to set the reference index). Additionally or alternatively, the video coder may set a reference index of the BVSP candidate to refer to a reference picture from which a predicted block for the BVSP-coded block was synthesized. The predicted block may be referred to as a BVSP reference block.

In this manner, or using other techniques, video encoder 20 and video decoder 30 may avoid storing a variable indicating that a BVSP-coded block was coded using BVSP in a decoded picture buffer (DPB). Likewise, video encoder 20 and video decoder 30 may discard a BVSP variable after coding a slice including a BVSP-coded block, before coding a subsequent slice. Video encoder 20 and video decoder 30 may enable motion parameter inheritance when coding a block that is co-located (in another picture and/or another view) to a DVSP-coded block.

As noted above, video encoder 20 and video decoder 30 may add motion information for a BVSP-coded block to a merge candidate list (or a candidate list for AMVP). When constructing such a candidate list, that is, a candidate list that is to include motion information for a BVSP-coded block as a candidate, video encoder 20 and video decoder 30 may add the candidate to a predetermined position in the merge candidate list. The predetermined position may be predetermined in the sense that that position is used for motion information of a BVSP-coded block, if such a candidate is to be added to the candidate list. The predetermined position may correspond to, for example, an ordinal first position in the list, a position following positions for all spatial candidates, or the like. In general, video encoder 20 and video decoder 30 may be configured such that the predetermined position is the same in both video encoder 20 and video decoder 30.

In order to implement the techniques described above, certain modifications may be made to 3D-HEVC, e.g., as described in JCT3V-C1005 (which is a working draft text for 3D-HEVC). Additions to JCT3V-C1005, per this disclosure, are emphasized using italicized text, whereas portions of JCT3V-C1005 that this disclosure proposes removing are emphasized in brackets and preceded by "removed." Headers, clauses, subclauses, and the like refer to portions of JCT3V-C1005, unless otherwise indicated. Ellipses represent text of JCT3V-C1005 that is not reproduced herein.

H.8.5.2.1 Derivation Process for Motion Vector Components and Reference Indices
Input to this process are ···
Outputs of this process are ···
the following applies.
   If PredMode[xC][yC] is equal to MODE_SKIP, the derivation process for luma motion vectors for merge mode as specified in subclause H.8.5.2.1.1 is invoked with the luma location (xC, yC), the luma location (xP, yP), variables nCS, nPbW, nPbH and the partition index part Idx as inputs and the output being the luma motion vectors mvL0, mvL1, the reference indices refIdxL0, refIdxL1, the prediction list utilization flags predFlagL0 and predFlagL1, the disparity vector availability flags ivpMvFlagL0 and ivpMvFlagL1, the disparity vectors ivpMvDispL0 and ivpMvDispL1, the flag vspModeFlag, the variable refViewIdx and the flag availableFlagIvMC. ···
When vspModeFlag is equal to 1, refIdxL0 is set to 0 when RefPicListX[0] is a long-term reference picture or AltRefIdxLX when RefPicListX[0] is a short-term reference picture
When ChromaArrayType is not equal to 0 and predFlagLX (with X being either 0 or 1) is equal to 1, the derivation process for chroma motion vectors in subclause 8.5.2.1.8 is invoked with mvLX and refIdxLX as inputs and the output being mvCLX.

H.8.5.4 Derivation Process for a Disparity Vector
Inputs to this process are: ···
Outputs of this process are: ···
   9. For each X from 0 to 1, the following applies:
     When availableDV is equal to 0, availableN is equal to 1 and PredFlagLX[xN][yN] is equal to 1, the following applies:
       If RefIdxLX[xN][yN] is greater than or equal to 0, the following applies:
         If RefPicListX[RefIdxLX[xN][yN]] is an inter-view reference picture, the following applies:
           refViewIdx=ViewIdx(RefPicListX[RefIdxLX[xN][yN]]) (H-274)
           mvDisp=MvLXN[xN][yN] (H-275)
           availableDV=1 (H-276)
         Otherwise (RefPicListX[RefIdxLX[xN][yN]] is not an inter-view reference picture), the following applies:
           When availableIvpMvSearchFlagN is equal to 1 and PredMode[xN][yN] is equal to MOD-E_SKIP and IvpMvFlagLX[xN][yN] is equal to 1, the following applies:
             ivpMvDispLXN=IvpMvDispLX[xN][yN] (H-277)
             availableFlagIvpMvLXN=1 (H-278)
         [removed: "Otherwise (RefIdxLX[xN][yN] is less than 0), the following applies:
           When VspModeFlag[xN][yN] is equal to 1, the following applies:
             refViewIdx=RefViewIdx[xN][yN] (H-279)
             mvDisp=MvLXN[xN][yN] (H-280)
             mvDisp[1]=0 (H-281)
             availableDV=1 (H-282)
             [Ed. (GT): In software refViewIdx is set equal to 0. (#19)]"]

H.8.5.2.1.1 Derivation Process for Luma Motion Vectors for Merge Mode
This process is only invoked when PredMode[xC][yC] is equal to MODE_SKIP or PredMode[xC][yC] is equal to MODE_INTER and merge_flag [xP][yP] is equal to 1, where (xP, yP) specify the top-left sample of the current luma prediction block relative to the top-left luma sample of the current picture.
Inputs of this process are ···
Outputs of this process are ···
The variables singleMCLFlag is derived as follows.
   If log 2_parallel_merge_level minus2 is greater than 0 and nCS is equal to 8, singleMCLFlag is set to 1.
   Otherwise, singleMCLFlag is set to 0. ···
9. The merge candidate list, mergeCandList, is constructed as specified by the following ordered steps.
   a. The variable numMergeCand is set equal to 0.
   b. The variable vspCandInListFlag is set equal to 0.
   c. [removed: "When availableFlagT is equal to 1, the insertion process for a candidate from a potentially view synthesis predicted neighbour as specified in subclause H.8.5.2.1.1.1 is invoked with the list mergeCandList, the variable numMergeCand, the variable vspCandInListFlag, the candidate position indicator N being equal to T, the luma location (xP, yP), and the variables nPbW and nPbH as the inputs and the outputs are the list mergeCandList, the variable numMergeCand and the flag vspCandInListFlag."] ···
13. The variable vspModeFlag is set equal to (mergeCandList[merge_idx[xP][yP]]==VSP).
[removed: "[Ed. (GT): In software VspModeFlag[×][y] is used in several places (deblocking filter, AMVP) this is not yet reflected in the draft.]"]

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
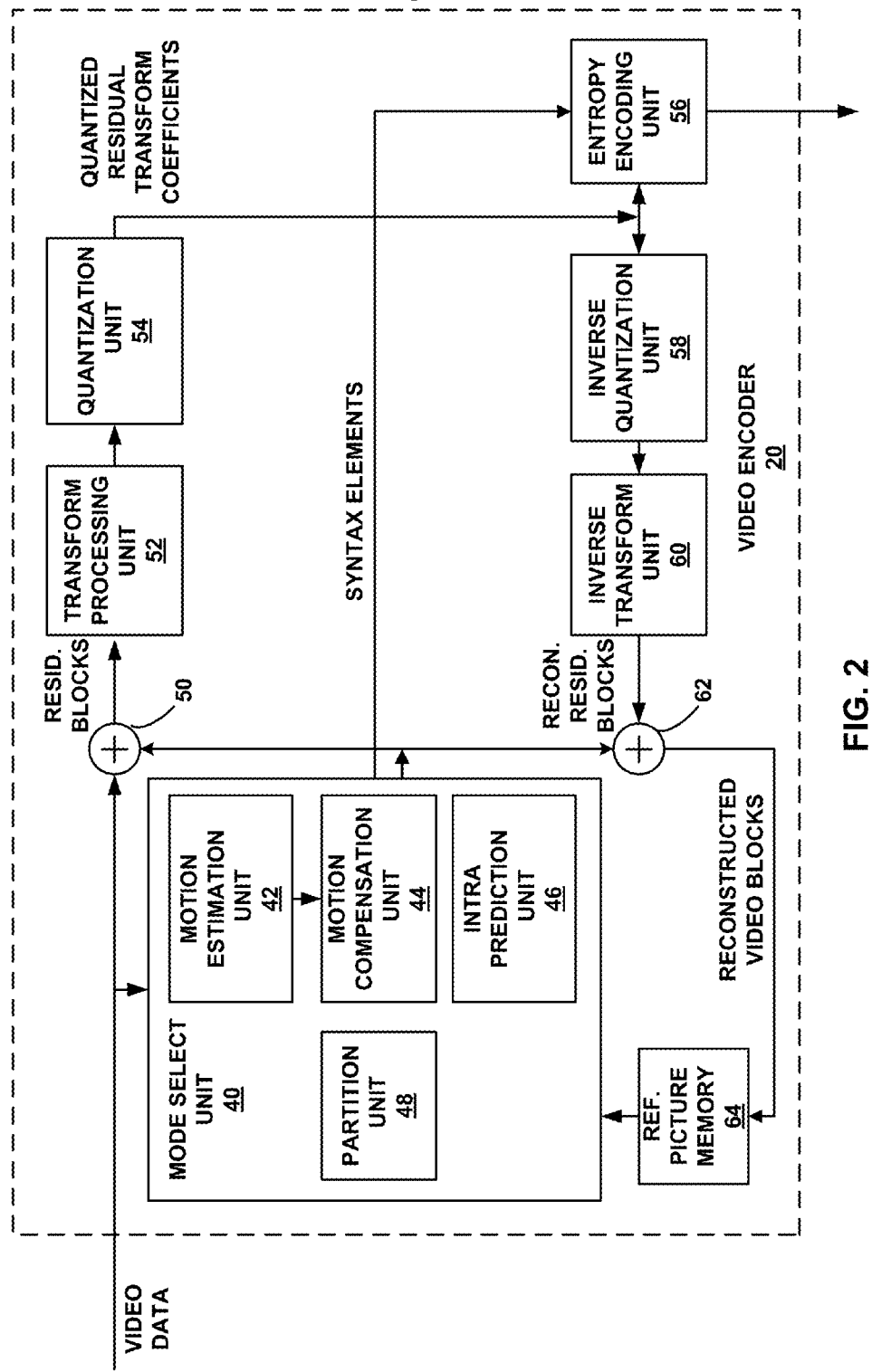
FIG. 2 is a block diagram illustrating an example of a video encoder that may implement techniques for encoding blocks using backward view synthesis prediction (BVSP).

FIG. 2 is a block diagram illustrating an example of video encoder 20 that may implement techniques for encoding blocks using backward view synthesis prediction (BVSP). Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

In accordance with the techniques of this disclosure, motion compensation unit 44 may predict blocks from a synthesized picture, e.g., using BVSP. For example, mode select unit 40 may determine that a reference picture of another view should be used to synthesize at least a portion of a reference picture from which a current block may be predicted. Motion compensation unit 44, or another element of video encoder 20 (e.g., a synthesizing unit, not shown in FIG. 2) may synthesize a portion of a reference picture from a picture stored in reference picture memory 64. The synthesizing unit, when present, may be included in mode select unit 40 or another element of video encoder 20.

Video encoder 20, in accordance with the techniques of this disclosure, may signal the picture from which the portion of the reference picture is synthesized for a block by setting a value for a reference index of motion information for the block to a value corresponding to the picture. That is, the reference index may identify the picture from which the portion of the reference picture is synthesized, as an index into a reference picture list including the picture such that the index corresponds to the picture in the reference picture list.

Accordingly, motion compensation unit 44 may perform backward view synthesis prediction for a current block in a current view. That is, motion compensation unit 44 may determine a picture of reference picture memory 64 in a first view. As explained in greater detail with respect to FIG. 7 below, motion compensation unit 44 may determine a neighboring block to the current block and a disparity vector for the neighboring block. Motion compensation unit 44 may then determine a depth block of a depth map in the first view identified by the disparity vector, relative to the current block in the current view.

Then, using depth values of the depth block, motion compensation unit 44 may warp pixel values of a picture in the first view, determined relative to positions of pixels in the current block, such that a predicted block is formed in a second view, different from the first view and the current view. Motion compensation unit 44 may provide this predicted block to summer 50 and summer 62, for use in calculating a residual and in reproducing the current block, respectively. Likewise, in accordance with the techniques of this disclosure, video encoder 20 may encode syntax data defining motion information for the current block such that the motion information includes a reference index having a value that identifies the picture in the first view from which the predicted block (i.e., a BVSP reference block) is synthesized.

Furthermore, the reference index may be stored along with other syntax elements for the block in reference picture memory 64. Reference picture memory 64 represents an example of a decoded picture buffer (DPB). Because the reference index for the block is stored having a value that identifies an actual reference picture, the motion information for the block may be used when coding motion information of a subsequent block, e.g., in accordance with advanced motion vector prediction (AMVP), temporal motion vector prediction (TMVP), and/or merge mode. Moreover, video encoder 20 need not implement additional logic functions for accessing motion information of BVSP-coded blocks in reference picture memory 64. Instead, video encoder 20 may use the same logic function to access motion information of BVSP-coded blocks as non-BVSP-coded blocks. Similarly, video encoder 20 may enable motion parameter inheritance (MPI) for blocks that are co-located (but in different views or different pictures) with BVSP-coded blocks.

As discussed above, the reference index for a BVSP-coded block may be stored in a DPB, e.g., reference picture memory 64. However, video encoder 20 may be configured to avoid storing a BVSP variable in reference picture memory 64. The BVSP variable may act as a state variable that indicates that a current block being encoded is encoded using BVSP. However, the BVSP variable need not be stored in reference picture memory 64, and thus, memory for the BVSP variable need not be allocated in reference picture memory 64.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to encode, e.g., in accordance with 3D-HEVC, motion information for a block of multiview video data, wherein the motion information includes a reference index that identifies a reference picture comprising a source for backward-warping view synthesis prediction (BVSP), perform BVSP on a portion of the reference picture to produce a BVSP reference block, and predict the block using the BVSP reference block.

Figure 3:
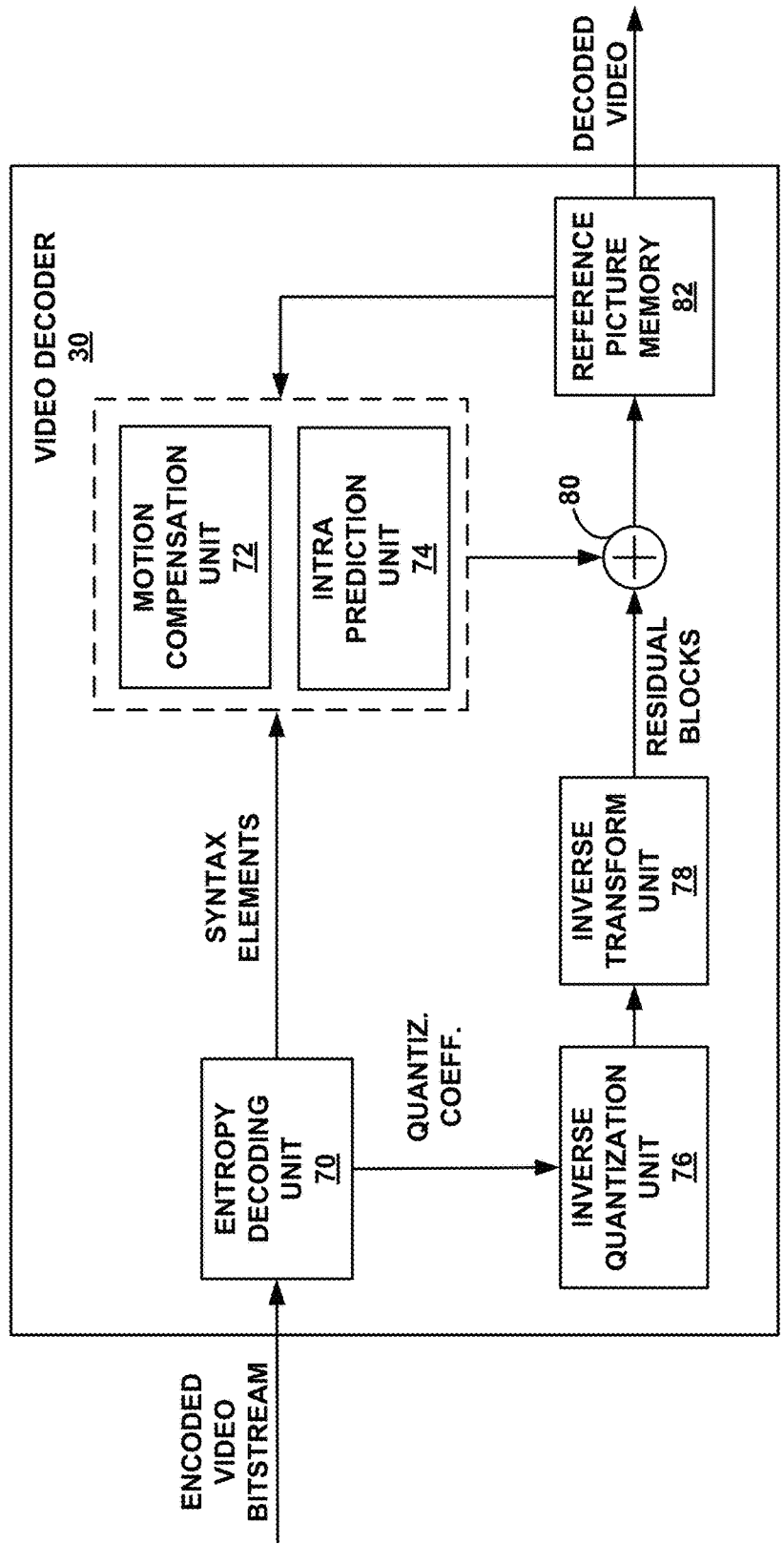
FIG. 3 is a block diagram illustrating an example of a video decoder that may implement techniques for decoding blocks using backward view synthesis prediction (BVSP).

FIG. 3 is a block diagram illustrating an example of video decoder 30 that may implement techniques for decoding blocks using backward view synthesis prediction (BVSP). In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, motion compensation unit 72 may predict blocks from a synthesized picture, e.g., using BVSP. For example, entropy decoding unit 70 may entropy decode syntax data for a block that indicates that the block is coded using BVSP, and send this decoded syntax data to motion compensation unit 72. In response, motion compensation unit 72 may determine that a reference picture of another view is to be used to synthesize at least a portion of a reference picture from which the block will predicted. Motion compensation unit 72, or another element of video decoder 30 (e.g., a synthesizing unit, not shown in FIG. 3) may synthesize a portion of a reference picture from a picture stored in reference picture memory 82. The synthesizing unit, when present, may be included in motion compensation unit 72 or another element of video decoder 30.

Video decoder 30, in accordance with the techniques of this disclosure, may determine the picture from which the portion of the reference picture is synthesized for a block from a value for a reference index of motion information for the block to a value corresponding to the picture. That is, the reference index may identify the picture from which the portion of the reference picture is synthesized, as an index into a reference picture list including the picture such that the index corresponds to the picture in the reference picture list. Entropy decoding unit 70 may decode syntax elements for motion information of a block to determine the reference index, which motion compensation unit 72 may use to identify a reference picture in reference picture memory 82 (acting as a decoded picture buffer (DPB)) from which to synthesize the reference block (i.e., the predicted block).

Accordingly, motion compensation unit 72 may perform backward view synthesis prediction for a current block in a current view. That is, motion compensation unit 72 may determine a picture of reference picture memory 82 in a first view. As explained in greater detail with respect to FIG. 7 below, motion compensation unit 72 may determine a neighboring block to the current block and a disparity vector for the neighboring block. Motion compensation unit 72 may then determine a depth block of a depth map in the first view identified by the disparity vector, relative to the current block in the current view.

Then, using depth values of the depth block, motion compensation unit 72 may warp pixel values of a picture in the first view, determined relative to positions of pixels in the current block, such that a predicted block (i.e., a BVSP reference block) is formed in a second view, different from the first view and the current view. Motion compensation unit 72 may provide this predicted block to summer 50 and summer 80, for use in calculating a residual and in reproducing the current block, respectively. Likewise, in accordance with the techniques of this disclosure, video decoder 30 may decode syntax data defining motion information for the current block such that the motion information includes a reference index having a value that identifies the picture in the first view from which the predicted block is synthesized.

Furthermore, the reference index may be stored along with other syntax elements for the block in reference picture memory 82. Reference picture memory 82 represents an example of a decoded picture buffer (DPB). Because the reference index for the block is stored having a value that identifies an actual reference picture, the motion information for the block may be used when coding motion information of a subsequent block, e.g., in accordance with advanced motion vector prediction (AMVP), temporal motion vector prediction (TMVP), and/or merge mode. Moreover, video decoder 30 need not implement additional logic functions for accessing motion information of BVSP-coded blocks in reference picture memory 82. Instead, video decoder 30 may use the same logic function to access motion information of BVSP-coded blocks as non-BVSP-coded blocks. Similarly, video decoder 30 may enable motion parameter inheritance (MPI) for blocks that are co-located (but in different views or different pictures) with BVSP-coded blocks.

As discussed above, the reference index for a BVSP-coded block may be stored in a DPB, e.g., reference picture memory 82. However, video decoder 30 may be configured to avoid storing a BVSP variable in reference picture memory 82. The BVSP variable may act as a state variable that indicates that a current block being decoded is decoded using BVSP. However, the BVSP variable need not be stored in reference picture memory 82, and thus, memory for the BVSP variable need not be allocated in reference picture memory 82.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to decode, in accordance with 3D-HEVC, motion information for a block of multiview video data, wherein the motion information includes a reference index that identifies a reference picture comprising a source for backward-warping view synthesis prediction (BVSP), perform BVSP on a portion of the reference picture to produce a BVSP reference block, and predict the block using the BVSP reference block.

Figure 4:
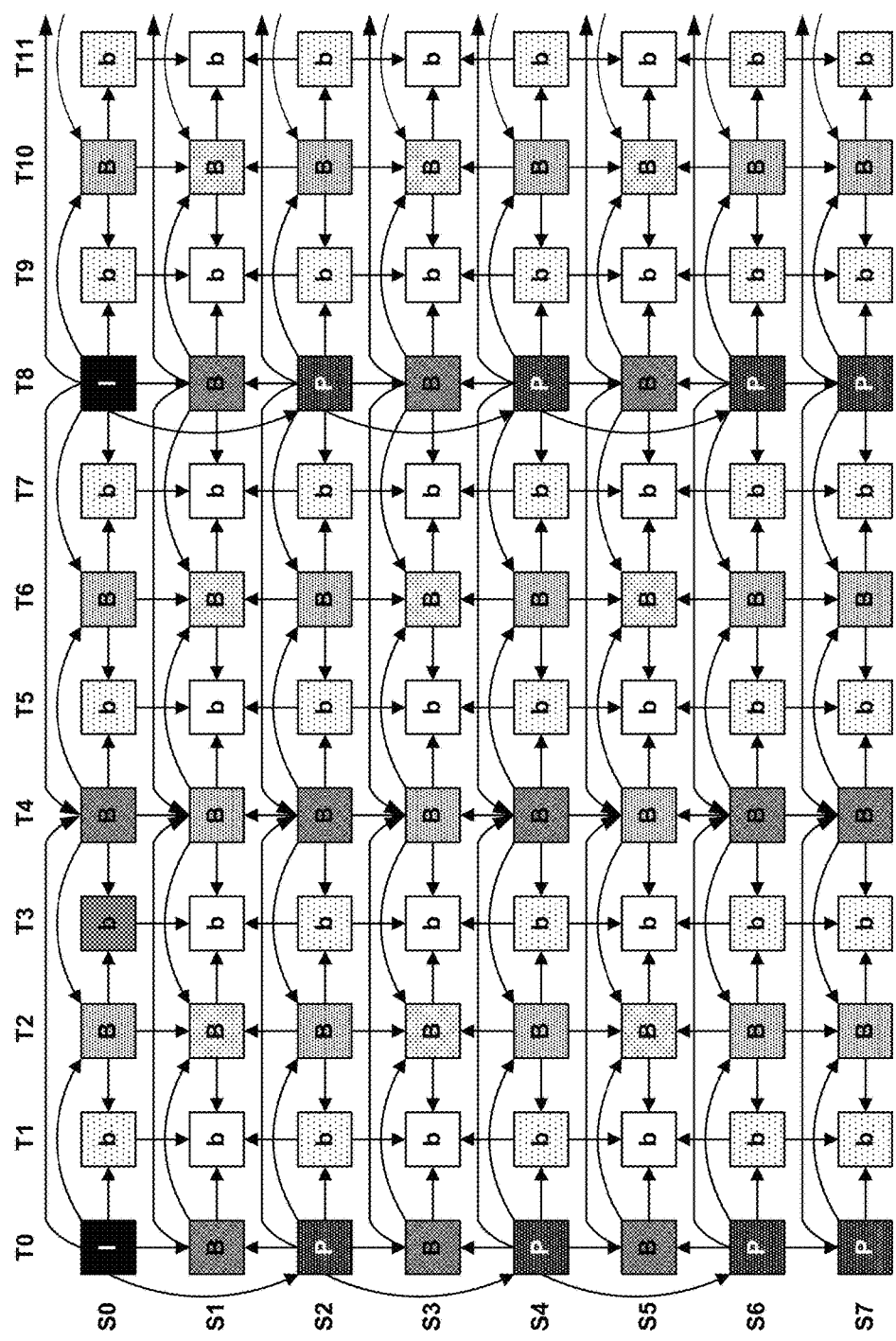
FIG. 4 is a conceptual diagram illustrating an example multiview video coding (MVC) structure.

FIG. 4 is a conceptual diagram illustrating an example multiview video coding (MVC) structure. MVC is an extension of H.264/AVC. It should be understood that similar concepts may apply to HEVC and extensions thereof, e.g., a multiview video coding extension. The example of FIG. 4 illustrates both inter-picture prediction within a view and inter-view prediction. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

A typical MVC decoding order arrangement is referred to as time-first coding. An access unit may include coded pictures of all views for one output time instance. For example, each of the pictures of time T0 may be included in a common access unit, each of the pictures of time T1 may be included in a second, common access unit, and so on. The decoding order is not necessarily identical to the output or display order.

Frames, i.e., pictures, in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the pointed-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So, a rendering device with an MVC decoder may expect 3D video contents with more than two views.

In MVC, inter-view prediction (IVP) is performed among pictures captured in different views of the same access unit (that is, with the same time instance) to remove correlation between views. An access unit is, generally, a unit of data including all view components (e.g., all NAL units) for a common temporal instance. Thus, in MVC, inter-view prediction is permitted among pictures in the same access unit. When coding a picture in one of the non-base views, the picture may be added into a reference picture list, if it is in a different view but within the same time instance (e.g., having the same POC value, and thus, in the same access unit). Adding a picture to the reference picture list allows for inter-view prediction of other non-base view pictures with reference to the picture. An inter-view prediction reference picture may be put in any position of a reference picture list, just like any inter prediction reference picture.

In the context of multiview video coding, there are two kinds of motion vectors. One kind of motion vector is a normal motion vector that points to temporal reference pictures, and the corresponding temporal inter prediction is motion-compensated prediction (MCP). The other kind of motion vector is a disparity motion vector that points to a picture in a different view (i.e., inter-view reference pictures), and the corresponding inter prediction is disparity-compensated prediction (DCP).

Motion vectors may be coded using various motion vector coding schemes. One motion vector coding scheme is temporal motion vector prediction (TMVP). TMVP may be used to improve the coding efficiency of HEVC. A video coder (e.g., video encoder 20 or video decoder 30) using TMVP may access the motion vector of a frame (or picture) in a decoded picture buffer, e.g., in a reference picture list.

Availability of TMVP may be signaled for a coded video sequence. For example, a sequence parameter set (SPS) may include a sps_temporal_mvp_enable_flag syntax element that has a value of 1. Furthermore, a value for slice_temporal_mvp_enable_flag may be signaled in a slice header of a slice in the sequence to indicate whether TMVP is enabled for the slice.

When TMVP is enabled for the current slice, if the current picture is a B slice, a collocated_from_l0_ flag may be signalled in the slice header to indicate whether the co-located picture is from RefPicList0 or RefPicList1. After a reference picture list is identified, collocated_ref_idx, signalled in slice header, may be used to identify the picture in the picture in the reference picture list. A co-located PU may then be identified by checking the co-located picture. Either the motion of the right-bottom PU of the CU containing this PU, or the motion of the right-bottom PU within the center PUs of the CU containing this PU may be used.

As discussed above, blocks (e.g., macroblocks and/or CUs/PUs/TUs) may be partitioned into various sub-blocks, and according to different partition modes. Let part_mode specify the partitioning mode of a current block (e.g., a current CU). In some examples, the value of part_mode may be restricted (e.g., in accordance with HEVC) for a block (e.g., a CU) as follows:
If the coding mode of one CU is equal to MODE_INTRA, part_mode shall be equal to 0 or 1.

Otherwise (the coding mode of one CU is equal to MODE_INTER), the following applies:
If the size of current CU is greater than the size of the smallest CU and asymmetric motion partitioning is enabled, part_mode shall be in the range of 0 to 2, inclusive or in the range of 4 to 7, inclusive. In other words, the value of 3 is unavailable, such that part_mode is in the range 0 to 7, inclusive, but excluding the value of 3.
Otherwise, if the size of current CU is greater than the size of the smallest CU and asymmetric motion partition is disabled, part_mode shall be in the range of 0 to 2, inclusive.
Otherwise, if the size of current CU is equal to 8, the value of part_mode shall be in the range of 0 to 2, inclusive.
Otherwise (the size of current CU is greater than 8), the value of part_mode shall be in the range of 0 to 3, inclusive.

In such examples, the relationship between part_mode and the associated value of the variable Part Mode may be defined according to Table 1, below. When part_mode is not present, the partition mode of current CU may be inferred to be equal to PART_2N×2N.

TABLE 1

Name Association to Prediction Mode and Partitioning Type

| The coding mode of one CU | part_mode | PartMode |
| --- | --- | --- |
| MODE_INTRA | 0 | PART_2N×2N |
|  | 1 | PART_N×N |
| MODE_INTER | 0 | PART_2N×2N |
|  | 1 | PART_2N×N |
|  | 2 | PART_N×2N |
|  | 3 | PART_N×N |
|  | 4 | PART_2N×nU |
|  | 5 | PART_2N×nD |
|  | 6 | PART_nL×2N |
|  | 7 | PART_nR×2N |

In accordance with the techniques of this disclosure, a video coder, such as video encoder 20 or video decoder 30, may be configured to synthesize a predicted block (i.e., a BVSP reference block) for a current block from a reference picture. Furthermore, the current block may be part of a picture in a current view, the reference picture may be in a first view different from the current view, and the predicted block may be synthesized in a second view different from both the current view and the first view. For instance, the current block may be in a picture of view S1, the reference block may be in a picture of view S0, and the predicted block may correspond to view S2. In such instances, view S2 might not actually be coded and transmitted in a bitstream, but instead, view S2 may represent a synthesized view. In accordance with the techniques of this disclosure, the current block may include a reference index that identifies a picture in view S2, and the current block may be coded using BVSP.

Figure 5:
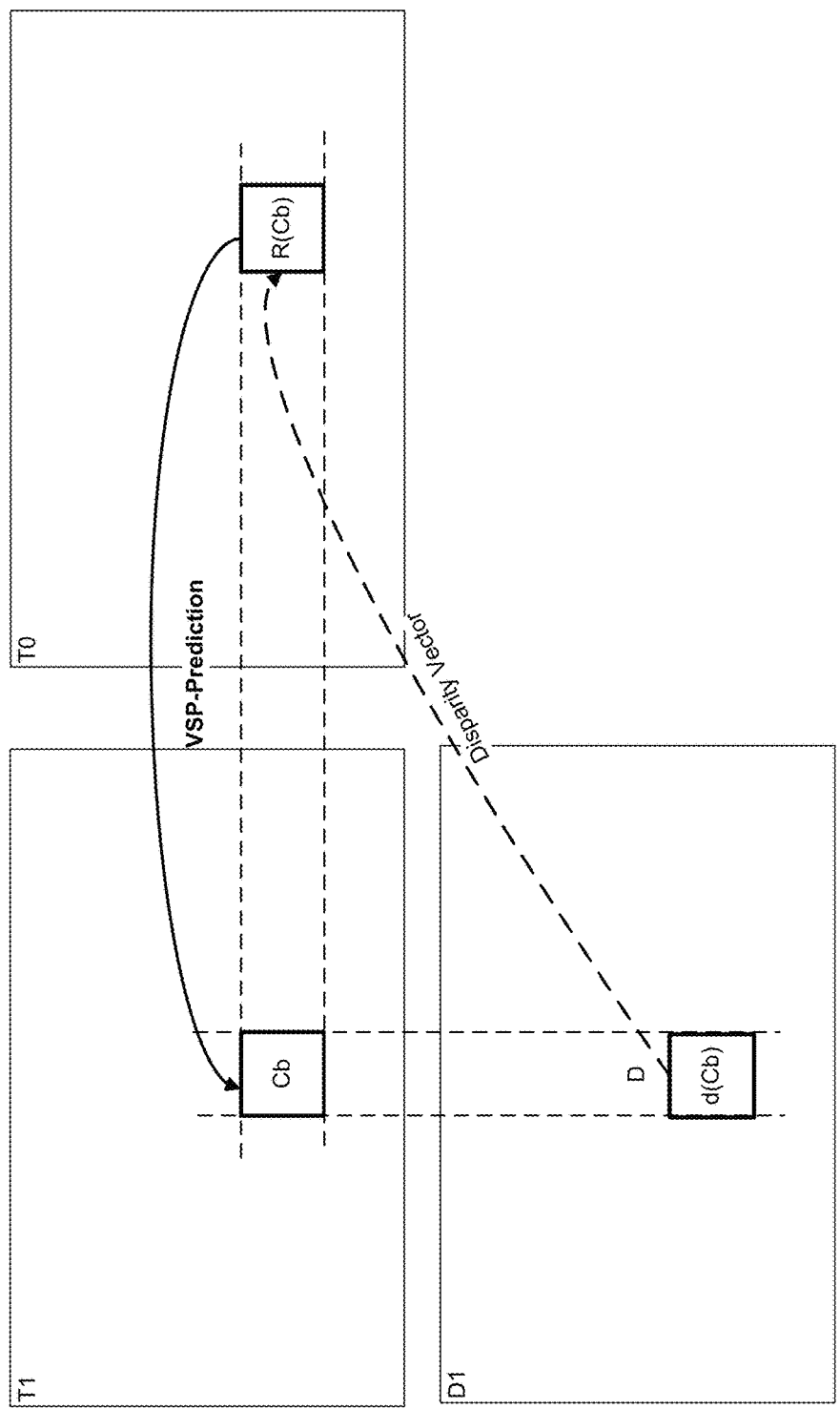
FIG. 5 is a conceptual diagram illustrating block-based view-synthesis prediction based on backward warping.

FIG. 5 is a conceptual diagram illustrating block-based view-synthesis prediction based on backward warping. Inter-view prediction may be performed using a disparity motion vector. A disparity motion vector may generally be similar to a temporal motion vector, except that the disparity motion vector refers to an inter-view reference picture. In some examples, the inter-view reference picture is in the same access unit as the current picture being coded.

How to derive the disparity vector may vary with each low-level coding tool, but typically, the depth data of the dependent views is employed for the texture view component coding, owing to the depth-first coding order. An in-loop block-based view synthesis inter-view prediction and depth-based motion vector prediction (D-MVP) in the 3D-AVC are the low-level coding tools, mainly, using the disparity vector converted from the depth values of the depth map in the dependent frame. In the 3D-AVC software, typically, the results of the conversion process from the actual depth map value to a disparity to a particular view are stored in look-up tables with camera parameters.

Block-based view synthesis prediction was originally proposed in JCT3V-A0107, which is available at http://phenix.it-sudparis.eu/jct2/doc_end_user/documents/1_Stockholm/wg11/JCT3V-A0107-v1.zip. In FIG. 5, let D represent depth, T represent texture, and numbers follow D or T represent a view. For instance, T0 represents a texture portion of view 0, T1 represents a texture portion of view 1, and D1 represents a depth portion of view 1. Assume that the following coding order is utilized—T0, D0, D1, T1. In this example, texture component T0 is a base view and T1 is dependent view coded with the VSP. Furthermore, in this example, Depth map components D0 and D1 are respective depth map associated with T0 and T1. Depth map component D0 is not shown in the example of FIG. 5.

In dependent view T1, sample values of a current block being coded (Cb) are predicted from reference area R(Cb) that includes sample values of the base view T0. The displacement vector between coded and reference samples is denoted as a derived disparity vector between T1 and T0 from a depth map value associated with a currently coded texture sample.

The process of converting from a depth value (e.g., disparity values in block d(Cb)) to a disparity vector may be performed, for example, with following equations:

$$Z(Cb(j, i)) = \frac{1}{\frac{d(Cb(j,i))}{255} \cdot \left(\frac{1}{Z_{near}} - \frac{1}{Z_{far}}\right) + \frac{1}{Z_{far}}}; \quad (1)$$

$$D(Cb(j, i)) = \frac{f \cdot b}{Z(Cb(j, i))}; \quad (2)$$

In equations (1) and (2) above, j and i are local spatial coordinates within Cb, d( ) is a depth map value in a depth map image of view #1, Z is its actual depth value, and D is the horizontal component of a derived disparity vector to a particular view #0. The parameters f, b, Znear and Zfar are parameters specifying the camera setup, i.e., the used focal length (f), camera separation (b) between view #1 and view #0, and depth range (Znear, Zfar) representing parameters of depth map conversion. The vertical component of the derived disparity vector is set equal to zero, because in the human visual system, the left and right eyes are positioned at the same height.

In some examples, such as a current 3DV-ATM implementation, equations (1) and (2) may be pre-computed for every depth map value (0 . . . 255), and the results may be stored as a look up-table.

In 3D-AVC, to indicate whether a block (e.g., an MB or a sub-MB) is coded using BVSP, one flag at the MB-level is used to signal whether the current MB is coded with the conventional skip/direct mode or with the skip/direct mode but predicted from a synthetic reference component. For each MB partition (from 16×16 to 8×8), a reference index in each reference picture list is used to signal the reference picture. When a partition is coded using BVSP mode, motion vector differences are not signaled, since motion vectors are not coded for BVSP-coded blocks.

Again in 3D-AVC, when either the flag or the reference index indicates a synthetic reference component, the prediction of one partition as described in the following item is invoked. For each MB partition with its size denoted by N×M (wherein N or M may be 8 or 16), if the partition is coded with BVSP mode, the current MB partition is further partitioned into several sub-regions with the size equal to K×K (wherein K may be 4, 2, or 1). For each sub-region, a separate disparity motion vector is derived and each sub-region is predicted from one block located by the derived disparity motion vector in the inter-view reference picture, i.e., R(cb) in FIG. 5. In common test conditions, K is defined to be 4. With such a prediction method, motion vector differences are not signaled (because, instead, the disparity motion vector is derived from the corresponding depth values of the depth view component). Moreover, for each partition, more than one motion vector may be applied for each reference picture list. Therefore, the derived motion vectors are more precise.

In 3D-AVC, when depth first coding order is applied, the disparity motion vector of each sub-region may be obtained by converting a depth value of the corresponding depth block in the corresponding non-base depth view, as shown in FIG. 5. The maximum value of four corner pixels within one corresponding depth block may be used to be converted to the horizontal component of a disparity motion vector. The vertical component of the disparity vector is set to 0.

Figure 6:
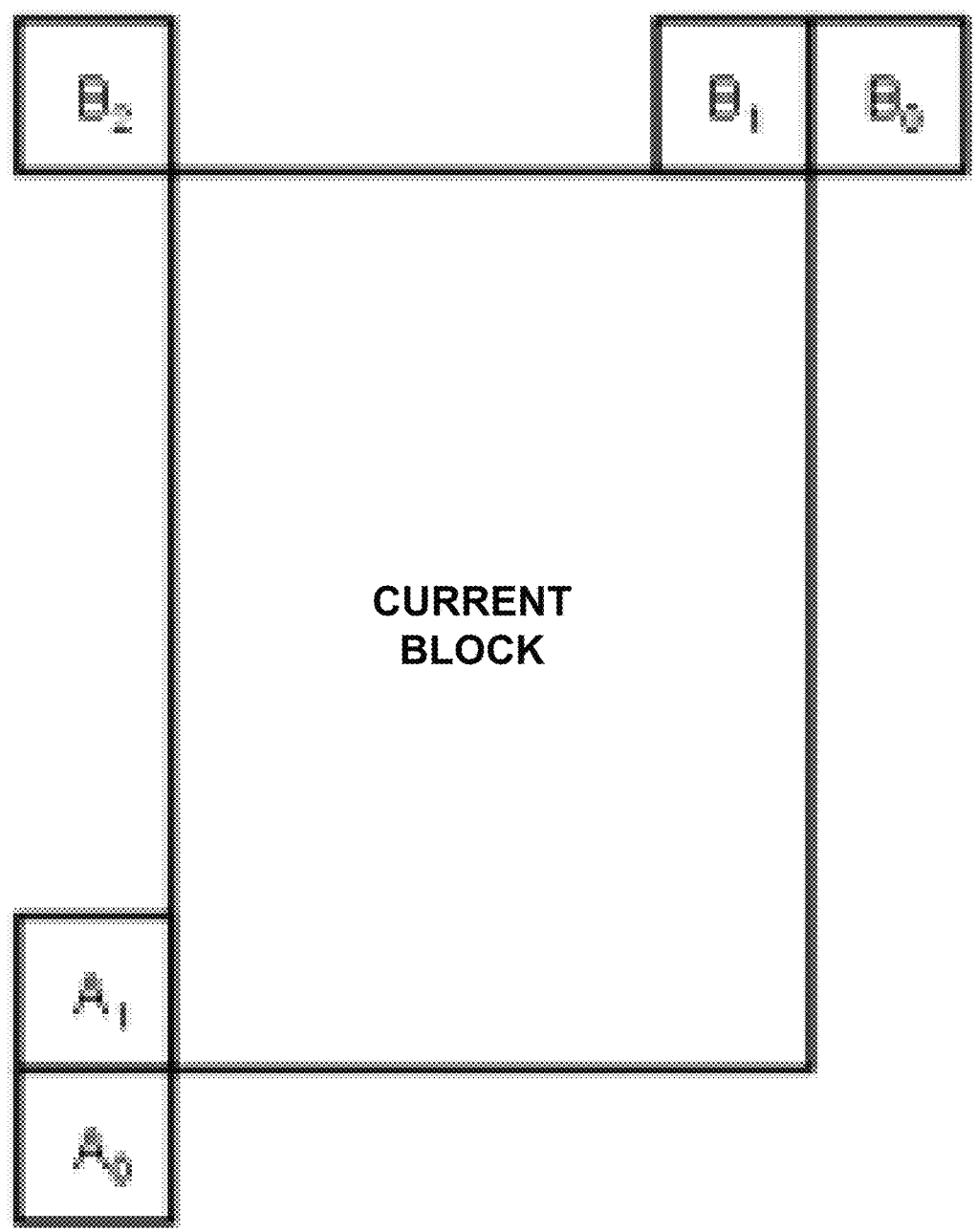
FIG. 6 is a conceptual diagram illustrating a current block and five spatially neighboring blocks.

FIG. 6 is a conceptual diagram illustrating a current block and five spatially neighboring blocks. The spatially neighboring blocks are labeled A0, A1, B0, B1, and B2. Block A0 represents a lower-left neighboring block, block A1 represents a left-neighboring block, block B0 represents an upper-right neighboring block, block B1 represents an above-neighboring block, and block B2 represents an upper-left neighboring block.

Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For 3D-HEVC, new coding tools, including those in coding unit/prediction unit level, for both texture and depth views may be included and supported. The 3D-HTM software version 6.0 for 3D-HEVC can be downloaded from the following link: https://hevc.hhi.fraunhofer.de/svn/svn_3DVCSoftware/tags/HTM-6.0/.

A description of the reference software, as well as the working draft of 3D-HEVC, is provided in Gerhard Tech, Krzysztof Wegner, Ying Chen, Sehoon Yea, "3D-HEVC Test Model Description draft 2," JCT3V-B1005, Joint Collaborative Team on 3D Video Coding Extension Development of ITU-T SG 16 WP 3 and ISO/IEC JTC 1/SC 29/WG 11, 2nd Meeting: Sanghai, CN, October 2012, available at http://phenix.it-sudparis.eu/jct2/doc_end_user/current_document.php?id=460. Another version of the reference software description of 3D-HEVC is available at http://phenix.it-sudparis.eu/jct2/doc_end_user/current_document.php?id=706.

Neighboring block-based disparity vector derivation (NBDV) may be used as a disparity vector derivation method in 3D-HEVC that uses the texture-first coding order for all the views. In the current 3D-HEVC design, the disparity vector derived from NBDV could be further refined by retrieving the depth data from a reference view's depth map. In NBDV, a disparity vector (DV) is used as an estimator of the displacement between two views. Because neighboring blocks share almost the same motion/disparity information in video coding, the current block can use the motion vector information in neighboring blocks as a good predictor. Following this idea, NBDV uses the neighboring disparity information for estimating the disparity vector in different views.

Several spatial and temporal neighboring blocks are firstly defined. Each of the neighboring blocks is then checked in a pre-defined order, determined by the priority of the correlation between the current block and the candidate block. Once a disparity motion vector (i.e., the motion vector that points to an inter-view reference picture) is found in the candidates, the disparity motion vector is converted to a disparity vector. Two sets of neighboring blocks are utilized. One set is from spatial neighboring blocks and the other set is from temporal neighboring blocks.

3D-HEVC first adopted the Neighboring Block (based) Disparity Vector (NBDV) method proposed in JCT3V-A0097, 3D-CE5.h: Disparity vector generation results, L. Zhang, Y. Chen, M. Karczewicz (Qualcomm). Implicit disparity vectors were included with a simplified NBDV in JCTVC-A0126, 3D-CE5.h: Simplification of disparity vector derivation for HEVC-based 3D video coding, J. Sung, M. Koo, S. Yea (LG). On top of that, in JCT3V-B0047, 3D-CE5.h related: Improvements for disparity vector derivation, J. Kang, Y. Chen, L. Zhang, M. Karczewicz (Qualcomm), the NBDV is further simplified by removing the implicit disparity vectors stored in the decoded picture buffer, but also improved a coding gain with the RAP picture selection.

In the current (as of the time of this disclosure) NBDV, five spatial neighboring blocks are used for the disparity vector derivation. They are the below-left, left, above-right, above, and above-left blocks of current block (e.g., current prediction unit (PU)), as denoted by A0, A1, B0, B1 or B2 in FIG. 6. It should be noted that these neighboring blocks are the same as those used in the MERGE modes in HEVC. Therefore, no additional memory access is required.

For checking temporal neighboring blocks, a video coder may first perform a construction process of a candidate picture list. Up to two reference pictures from current view may be treated as candidate pictures. The video coder may first insert a co-located reference picture into the candidate picture list, followed by the rest of the candidate pictures in the ascending order of reference index. When the reference pictures with the same reference index in both reference picture lists are available, the one in the same reference picture list of the co-located picture may precede the other one. For each candidate picture in the candidate picture list, three candidate regions may be determined for deriving the temporal neighboring blocks.

When a block is coded with inter-view motion prediction, a disparity vector may be derived for selecting a corresponding block in a different view. An implicit disparity vector (IDV, also referred to as a derived disparity vector) is referred to as the disparity vector derived in the inter-view motion prediction. Even though the block is coded with motion prediction, the derived disparity vector is not discarded for the purpose of coding a following block.

In the current design of 3D-HTM 6.0, the video coder, in accordance with the NBDV process, checks disparity motion vectors in the temporal neighboring blocks, disparity motion vectors in the spatial neighboring blocks, and then the IDVs in order. Once, the disparity motion vector or IDV is found, the process is terminated.

A video coder may further refine disparity vectors derived using NBDV by accessing depth information. When one disparity vector is derived from the NBDV process, the video coder may further refine the disparity vector by retrieving the depth data from the depth map of the reference view. The refinement process may include two steps:

a) Locate a corresponding depth block by the derived disparity vector in the previously coded reference depth view, such as the base view; the size of the corresponding depth block is the same as that of current PU.
 b) Select one depth value from four corner pixels of the corresponding depth block and convert it to the horizontal component of the refined disparity vector. The vertical component of the disparity vector is unchanged.

The video coder may use the refined disparity vector for inter-view motion prediction while the unrefined disparity vector is used for inter-view residual prediction. In addition, the refined disparity vector may be stored as the motion vector of one PU if it is coded with backward VSP mode.

In accordance with the techniques of this disclosure, one of the spatially neighboring blocks may correspond to a BVSP-coded block, and another one of the spatially-neighboring blocks may correspond to a non-BVSP-coded block. For example, block A1 may correspond to a BVSP-coded block and block B1 may correspond to a non-BVSP-coded block. Nevertheless, when coding motion information for the current block, a video coder may access motion information for both block A1 and block B1 using the same logic function. It is presumed that the motion information for the BVSP-coded block, i.e., block A1 in the example stated above, includes a reference index that identifies a reference picture. Therefore, a separate logic function for accessing motion information of block A1 need not be provided in the video coder.

Figure 7:
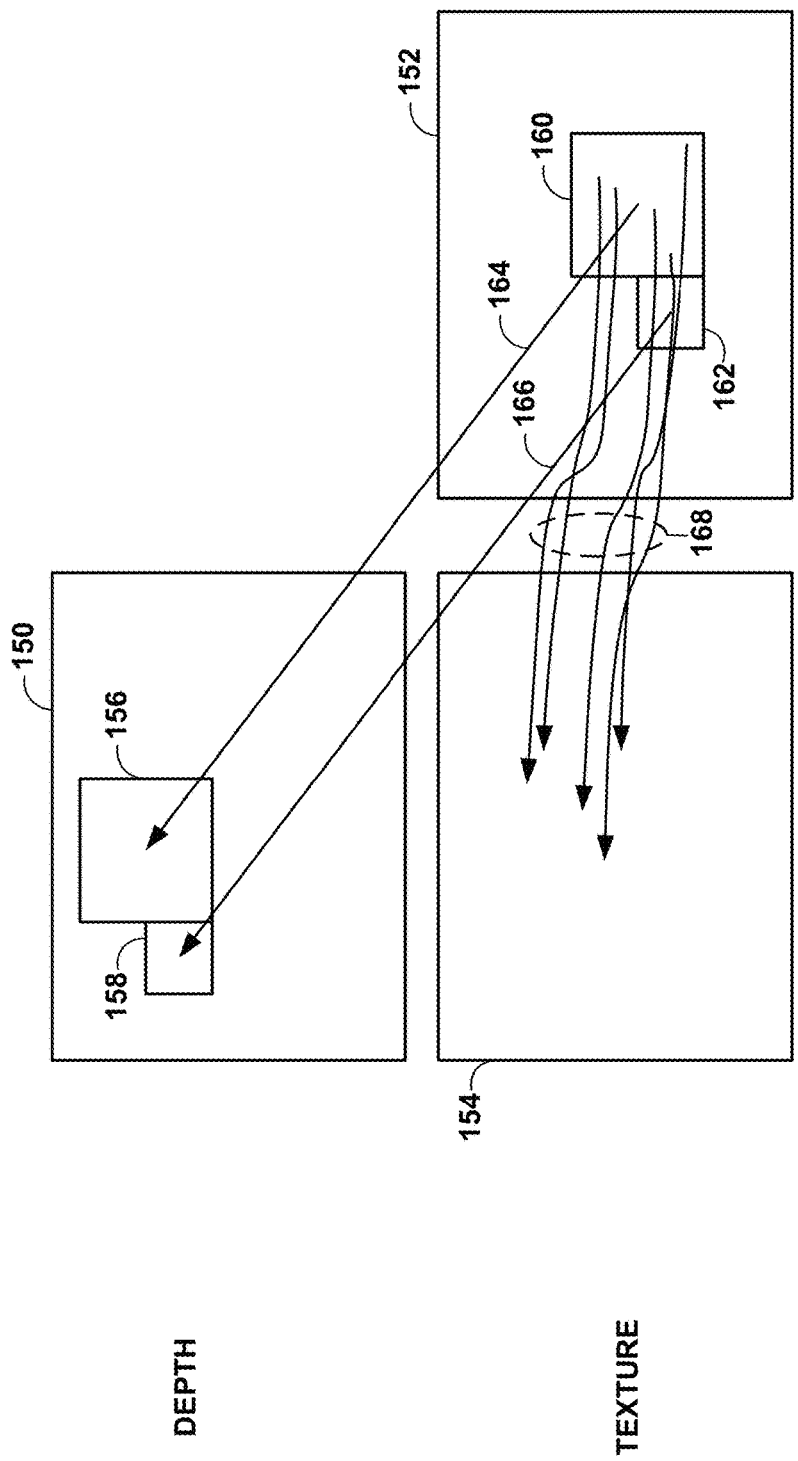
FIG. 7 is a conceptual diagram illustrating techniques related to backward view synthesis prediction (BVSP) using neighboring blocks.

FIG. 7 is a conceptual diagram illustrating techniques related to backward view synthesis prediction (BVSP) using neighboring blocks. BVSP has been proposed, and adopted, as a technique for 3D-HEVC. The backward-warping VSP approach as proposed in JCT3V-00152 was adopted in the 3rd JCT-3V meeting. The basic idea of this backward-warping VSP is the same as the block-based VSP in 3D-AVC. Both of these two techniques use the backward-warping and block-based VSP to avoid transmitting the motion vector differences and use more precise motion vectors. Implementation details are different due to different platforms. This disclosure generally uses the initialism BVSP to refer to backward view synthesis prediction in 3D-HEVC, although BVSP may also refer to block-based view synthesis prediction of 3D-AVC.

In 3D-HTM, texture first coding is applied in common test conditions. Therefore, the corresponding non-base depth view is unavailable when decoding one non-base texture view. Therefore, the depth information is estimated and used to perform BVSP. In order to estimate the depth information for a block, it was proposed to first derive a disparity vector from the neighboring blocks, and then use the derived disparity vector to obtain a depth block from a reference view.

In HTM 5.1 test model, there exists a process to derive a disparity vector predictor, known as NBDV (Neighboring Block Disparity Vector). Let (dvx, dvy) denote the disparity vector identified from the NBDV function, and the current block position is (blockx, blocky). It was proposed to fetch a depth block at (blockx+dvx, blocky+dvy) in the depth image of the reference view. The fetched depth block would have the same size of the current prediction unit (PU), and it would then be used to do backward warping for the current PU. FIG. 7 illustrates the steps for locating a depth block from the reference view and then using the depth block for BVSP prediction.

In the example of FIG. 7, depth picture 150 and texture picture 154 correspond to the same view, while texture picture 152 corresponds to a different view. In particular, texture picture 152 includes current block 160 being coded relative to texture picture 154, acting as a reference picture. A video coder may refer to neighboring block 162, which neighbors current block 160. Neighboring block 162 includes a previously determined disparity vector 166. Disparity vector 166 may be derived as a disparity vector 164 for current block 160. Thus, disparity vector 164 refers to depth block 156 in depth picture 150 of the reference view.

The video coder may then use pixels (that is, depth values) of depth block 156 to determine disparity values 168 for pixels (that is, texture values) of current block 160, for performing backward warping. The video coder may then synthesize values for a predicted block (i.e., a BVSP reference block) for current block 160 from the pixels identified by disparity values 168. The video coder may then predict current block 160 using this predicted block. For instance, during video encoding by video encoder 20, video encoder 20 may calculate pixel-by-pixel differences between the predicted block and current block 160 to produce a residual value, which video encoder 20 may then transform, quantize, and entropy encode. On the other hand, during video decoding by video decoder 30, video decoder 30 may entropy decode, inverse quantize, and inverse transform residual data, then combine the residual data (on a pixel-by-pixel basis) with the predicted block to reproduce current block 160.

JCT3V-O0152 proposed changes to the BVSP techniques of 3D-HEVC, as described below. In particular, italicized text represents text added to 3D-HEVC, while bracketed text preceded by "removed:" represents deletions from 3D-HEVC: If BVSP is enabled in the sequence, the NBDV process for inter-view motion prediction is changed and the differences are highlighted in the following paragraphs:
  For each of the temporal neighboring blocks, if it uses a disparity motion vector, the disparity motion vector is returned as the disparity vector and it is further refined with the method described in Section 1.6.1.3 of 3D-HEVC.
  For each of the spatial neighboring blocks, the following apply:
    For reference picture list 0 and reference picture list 1 in order:
      If it uses a disparity motion vector, the disparity motion vector is returned as the disparity vector and it is further refined with the method described in Section 1.6.1.3.
      Otherwise, if it uses BVSP mode, the associated motion vector is returned as the disparity vector. It is further refined in a similar way as described in Section 1.6.1.3. However, the maximum depth value is selected from all pixels of the corresponding depth block rather than four corner pixels and the vertical component of the refined disparity vector is set to 0.
    For each of the spatial neighboring blocks, if it uses an IDV, the IDV is returned as the disparity vector and it is further refined with the method described in Section 1.6.1.3.

The introduced BVSP mode is treated as a special inter-coded mode, and a flag indicating the usage of BVSP mode may be maintained for each PU. Rather than signalling the flag in the bitstream, a new merging candidate (BVSP merging candidate) was added to the merge candidate list. The flag is dependent on whether the decoded merge candidate index corresponds to a BVSP merging candidate. The BVSP merging candidate is defined, per JCT3V-O0152, as follows:
  Reference picture index for each reference picture list: −1
  Motion vector for each reference picture list: the refined disparity vector In JCT3V-O0152, the inserted position of the BVSP merging candidate is dependent on the spatial neighboring blocks, as discussed below:
  If any of the five spatial neighboring blocks (A0, A1, B0, B1, or B2, shown in FIG. 6) is coded with the BVSP mode, i.e., the maintained flag of the neighboring block is equal to 1, BVSP merging candidate is treated as the corresponding spatial merging candidate and inserted to the merge candidate list. BVSP merging candidate will only be inserted to the merge candidate list once.
  Otherwise (none of the five spatial neighboring blocks are coded with the BVSP mode), the BVSP merging candidate is inserted to the merge candidate list just before the temporal merging candidates.

It is noted that during the combined bi-predictive merging candidate derivation process, additional conditions may be checked to avoid including the BVSP merging candidate.

JCT3V-J0152 further provided that each BVSP coded PU with its size denoted by N×M is further partitioned into several sub-regions with the size equal to K×K (wherein K may be 4 or 2). For each sub-region, a separate disparity motion vector is derived, and each sub-region is predicted from one block located by the derived disparity motion vector in the inter-view reference picture. In other words, the size of motion-compensation unit for BVSP coded PUs are set to K×K. In common test conditions, K is set to 4.

JCT3V-J0152 further provides that for each sub-region (4×4 block) within one PU coded with BVSP mode, a corresponding 4×4 depth block is firstly located in the reference depth view with the refined disparity vector aforementioned above. Secondly, the maximum value of the sixteen depth pixels in the corresponding depth block is selected. Thirdly, the maximum value is converted to the horizontal component of a disparity motion vector. The vertical component of the disparity motion vector is set to 0.

In 3D-HEVC, when the texture firstly coding order is applied, for each prediction unit (PU), a disparity vector could be derived from NBDV with/without the consideration the depth values in the reference depth view. After a disparity vector is obtained, it would be further refined for each 4×4 sub-region of one PU, if the PU is coded with BVSP mode.

3D-HEVC describes the refinement process as including two steps: 1) select one maximum depth value from the 4×4 depth block in the reference depth view which is located by the derived disparity vector; 2) convert the depth value to a horizontal component of the refined disparity vector while keeping the vertical component of the refined disparity vector to be 0. After the disparity vector is refined for one 4×4 sub-region of one PU, 3D-HEVC provides that the refined disparity vector is used to locate one block in the reference texture view for motion compensation.

In current 3D-HTM, BVSP is enabled for skip/merge mode by adding a special candidate to the merge candidate list. This new candidate, i.e., BVSP merging candidate, is constructed with the following settings:

- Prediction direction: bi-prediction for B slices and uni-prediction for P slices
- Reference index of each reference picture list: −1.
- Motion vector of each reference picture list: the derived disparity vector from Do-NBDV
- A BVSP mode variable (or flag, attached to each block) to indicate the usage of BVSP mode For all the other merging candidates, 3D-HEVC indicates that a BVSP mode variable is set to 0. Although bi-prediction is associated with the BVSP merging candidate in the software, it is uni-predicted from the inter-view reference picture during the motion compensation process.

Whereas 3D-HEVC utilizes a reference index value of −1 for a BVSP-coded block, in accordance with the techniques of this disclosure, a video coder may use a reference index for motion information of block 160 that identifies a reference picture from which a predicted block (i.e., a BVSP reference block) is synthesized. Thus, the reference index for block 160 in the example of FIG. 7 would identify texture picture 154 in a reference picture list. In general, an inter-view reference picture, such as texture picture 154, may form part of the same access unit as a picture currently being coded, e.g., texture picture 152. Furthermore, it should be understood that texture picture 154 and depth picture 150 (also referred to as a depth map) may form part of the same view, whereas texture picture 152 may form part of a different view, and the predicted block (synthesized from texture picture 154) may form part of yet another, different view.

Figure 8:
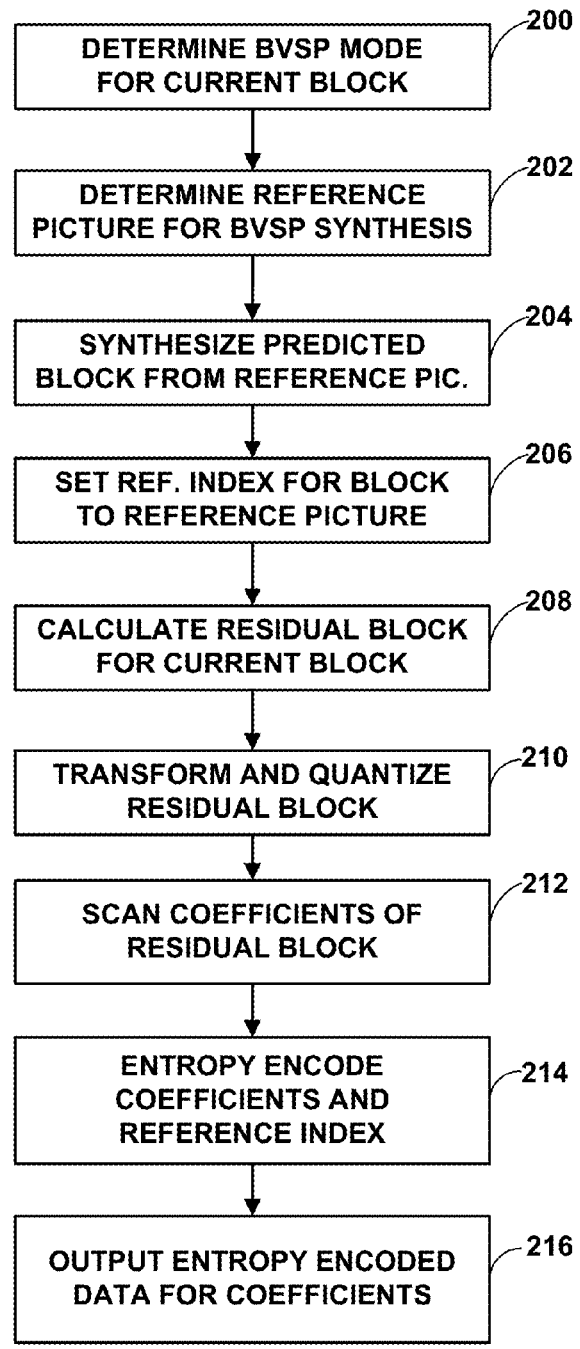
FIG. 8 is a flowchart illustrating an example method for encoding a current block using BVSP in accordance with the techniques of this disclosure.

FIG. 8 is a flowchart illustrating an example method for encoding a current block using BVSP in accordance with the techniques of this disclosure. The current block may comprise a current CU or a portion of the current CU. Although described with respect to video encoder 20 (FIGS. 1 and 2), it should be understood that other devices may be configured to perform a method similar to that of FIG. 8.

Initially, video encoder 20 may determine that BVSP mode coding should be used to code a current block (200). For instance, video encoder 20 may perform several coding passes, attempting various coding modes, and then compare rate-distortion performance metrics resulting from these various potential coding modes. Video encoder 20 may then determine that, among the tested modes, BVSP mode exhibits the best rate-distortion performance metrics, and thus, select BVSP mode for the current block. Likewise, during these tests, mode select unit 40 of video encoder 20 may determine a reference view to use for synthesizing a predicted block (i.e., a BVSP reference block) for the current block. Thus, video encoder 20 may determine a reference picture from the reference view for BVSP synthesis (202).

Video encoder 20 may then synthesize a predicted block from the reference picture in the reference view (204). Furthermore, in accordance with the techniques of this disclosure, video encoder 20 may set a value for a reference index for the BVSP-coded block to identify the reference picture in a reference picture list (206).

Video encoder 20 may then calculate a residual block for the current block (208). That is, summer 50 may calculate pixel-by-pixel differences between the original block and the predicted block (synthesized from the reference picture), generating a residual block from these differences. Video encoder 20 may then transform and quantize coefficients of the residual block (210). In particular, transform processing unit 52 may perform the transform to calculate transform coefficients, while quantization unit 54 may quantize the transform coefficients.

Next, video encoder 20 may scan the quantized transform coefficients of the residual block (212). During the scan, or following the scan, video encoder 20 may entropy encode the coefficients, as well as the reference index that identifies the reference picture from which the predicted block is synthesized (214). For example, video encoder 20 may encode the coefficients and the reference index using CABAC. Video encoder 20 may then output the entropy coded data of the block (216).

In this manner, FIG. 8 represents an example of a method of encoding video data including encoding motion information for a block of multiview video data, wherein the motion information includes a reference index that identifies a reference picture comprising a source for backward-warping view synthesis prediction (BVSP), performing BVSP on a portion of the reference picture to produce a BVSP reference block, and predicting the block using the BVSP reference block.

Figure 9:
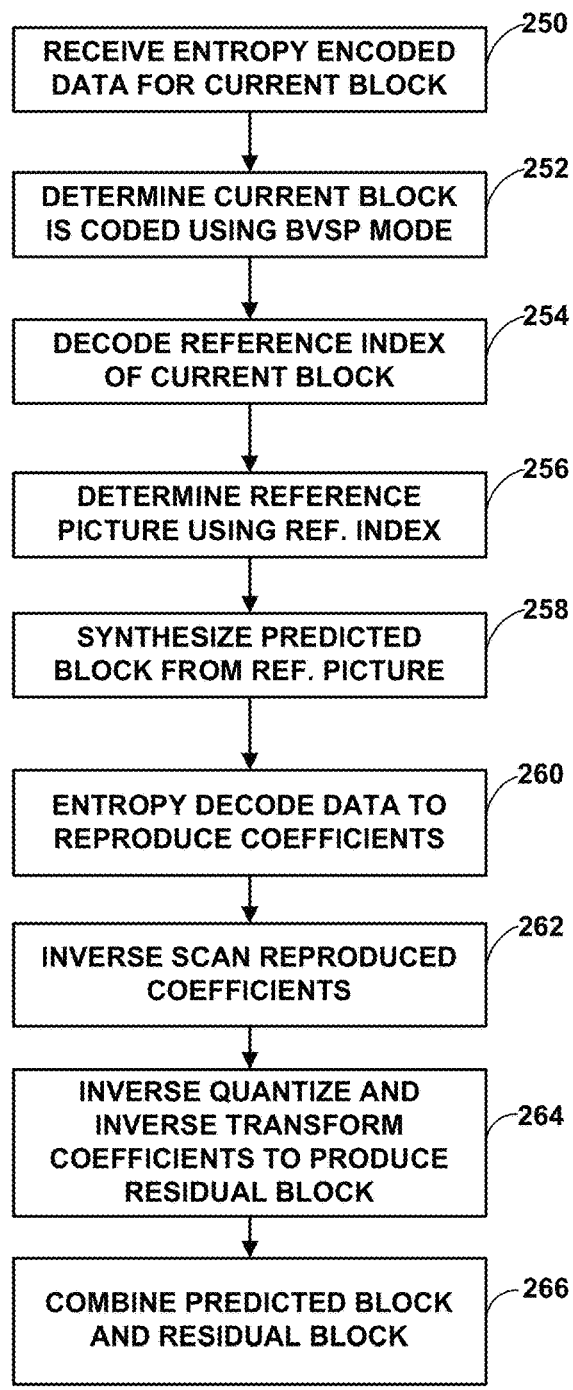
FIG. 9 is a flowchart illustrating an example method for decoding a current block of video data using BVSP in accordance with the techniques of this disclosure.

FIG. 9 is a flowchart illustrating an example method for decoding a current block of video data using BVSP in accordance with the techniques of this disclosure. The current block may comprise a current CU or a portion of the current CU. Although described with respect to video decoder 30 (FIGS. 1 and 3), it should be understood that other devices may be configured to perform a method similar to that of FIG. 9.

Video decoder 30 may initially receive entropy encoded data for a current block (250). The entropy coded data may include, among other syntax elements, data indicating that the current block is encoded using BVSP mode and a reference index that identifies a reference picture from which a predicted block (i.e., a BVSP reference block) is to be synthesized. Accordingly, video decoder 30 may entropy decode the entropy encoded data to determine that the current block is coded using BVSP mode (252) and entropy decode the reference index of the current block (254). The reference index may be included as motion information for the current block.

Video decoder 30 may then determine a reference picture using the reference index (256). For instance, video decoder 30 may construct a reference picture list, including identifiers for reference pictures in a decoded picture buffer, and then determine to which of the reference pictures in the reference picture list the reference index refers. Video decoder 30 may then synthesize a predicted block from that reference picture (258). As discussed above with respect to FIG. 7, for example, video decoder 30 may refer to a disparity vector of a spatially neighboring block of the current block, identify a depth block relative to the current block using the disparity vector, then use the depth values of the depth block to warp pixels of the reference picture to positions of pixels in the current block to synthesize the predicted block.

Video decoder 30 may further entropy decode the entropy coded data to reproduce coefficients of a residual block for the current block (260). Video decoder 30 may then inverse scan the reproduced coefficients (262), to create a block of quantized transform coefficients. Video decoder 30 may then inverse quantize and inverse transform the coefficients to produce a residual block (264). Video decoder 30 may ultimately decode the current block by combining the predicted block and the residual block (266). That is, video decoder 30 may combine the pixels of the predicted block with the pixels of the residual block, on a pixel-by-pixel basis, to reproduce the current block. Furthermore, video decoder 30 may store the decoded block, including motion information such as the reference index value, in a DPB (e.g., reference picture memory 82) for later use when decoding subsequent blocks and/or motion information for subsequent blocks.

In this manner, FIG. 9 represents an example of a method of decoding video data including decoding motion information for a block of multiview video data, wherein the motion information includes a reference index that identifies a reference picture comprising a source for backward-warping view synthesis prediction (BVSP), performing BVSP on a portion of the reference picture to produce a BVSP reference block, and predicting the block using the BVSP reference block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a reference index that identifies a reference picture in a reference picture list for a block of multi-view video data, the reference picture comprising a source for backward-warping view synthesis prediction (BVSP), the reference index comprising an index into the reference picture list, and wherein determining the reference index comprises:
      when an ordinal first reference picture of the reference picture list is a long-term reference picture, setting the reference index equal to zero to identify the ordinal first reference picture; or
      when the ordinal first reference picture of the reference picture list is a short-term reference picture, setting the reference index equal to a non-zero value of an index of a long-term reference picture in the reference picture list;
   determining a position of the reference picture in the reference picture list as corresponding to a value of the index into the reference picture list;
   performing BVSP on a portion of the reference picture identified by the reference index to produce a BVSP reference block; and
   predicting the block using the BVSP reference block.

2. The method of claim 1, wherein the block is included in a current view, wherein the reference picture is included in a first reference view different from the current view, and wherein performing BVSP comprises performing BVSP to produce the BVSP reference block in a second reference view that is different from the first reference view and the current view.

3. The method of claim 1, further comprising, when decoding motion information for a different block using temporal motion vector prediction (TMVP) relative to the block, accessing the motion information of the block using a function that is also used to access motion information for inter-view predicted blocks.

4. The method of claim 3, wherein accessing comprises accessing the motion information without accessing information indicating whether the block is coded using BVSP.

5. The method of claim 1, further comprising deblocking edges of the block without regard for whether the block was coded using BVSP.

6. The method of claim 1, further comprising decoding motion information for the block using merge mode, comprising:
creating a merge candidate list;
selecting a BVSP candidate from the merge candidate list; and
immediately after creating the merge candidate list and selecting the BVSP candidate, setting a value for the reference index of the block.

7. The method of claim 1, further comprising decoding motion information for the block using merge mode, comprising:
creating a merge candidate list;
selecting a BVSP candidate from the merge candidate; and
setting a reference index of the BVSP candidate to refer to the reference picture.

8. The method of claim 1, wherein the reference picture is stored in a decoded picture buffer (DPB), the method further comprising preventing storing a variable indicating the use of BVSP for the block in the reference picture of the DPB.

9. The method of claim 1, further comprising, when decoding a co-located block to the block, enabling motion parameter inheritance.

10. The method of claim 1, further comprising, when constructing a merge candidate list to include the motion information for the block as a merge candidate, adding the merge candidate into a predetermined position in the merge candidate list, wherein the predetermined position corresponds to a position that is predetermined for a BVSP candidate.

11. The method of claim 1, wherein the block comprises a first neighboring block to a current block, the method further comprising, when decoding motion information for the current block:
accessing the first neighboring block as a first advanced motion vector prediction (AMVP) candidate using a logic function; and
accessing a second, different neighboring block to the current block as a second, different AMVP candidate using the same logic function.

12. The method of claim 1, further comprising:
entropy decoding entropy encoded quantized transform coefficients for the block and entropy encoded data for the reference index;
inverse quantizing the quantized transform coefficients;
inverse transforming the transform coefficients to reproduce a residual block for the block; and
combining the BVSP reference block with the residual block to reproduce the block.

13. The method of claim 1, wherein decoding comprises decoding in accordance with Three-Dimensional High Efficiency Video Coding (3D-HEVC).

14. A method of encoding video data, the method comprising:
determining a reference index that identifies a reference picture in a reference picture list for a block of multi-view video data, the reference picture comprising a source for backward-warping view synthesis prediction (BVSP), the reference index comprising an index into the reference picture list, and wherein determining the reference index comprises:
when an ordinal first reference picture of the reference picture list is a long-term reference picture, setting the reference index equal to zero to identify the ordinal first reference picture; or
when the ordinal first reference picture of the reference picture list is a short-term reference picture, setting the reference index equal to a non-zero value of an index of a long-term reference picture in the reference picture list;
determining a position of the reference picture in the reference picture list as corresponding to a value of the index into the reference picture list;
performing BVSP on a portion of the reference picture identified by the reference index to produce a BVSP reference block; and
predicting the block using the BVSP reference block.

15. The method of claim 14, wherein the block is included in a current view, wherein the reference picture is included in a first reference view different from the current view, and wherein performing BVSP comprises performing BVSP to produce the BVSP reference block in a second reference view that is different from the first reference view and the current view.

16. The method of claim 14, further comprising deblocking edges of the block without regard for whether the block was coded using BVSP.

17. The method of claim 14, further comprising, when encoding motion information for a different block using temporal motion vector prediction (TMVP) relative to the block, accessing the motion information of the block using a function that is also used to access motion information for inter-view predicted blocks.

18. The method of claim 14, further comprising encoding motion information for the block using merge mode, comprising:
creating a merge candidate list;
selecting a BVSP candidate from the merge candidate; and
immediately after creating the merge candidate list and selecting the BVSP candidate, setting a value for the reference index of the block.

19. The method of claim 14, further comprising encoding motion information for the block using merge mode, comprising:
creating a merge candidate list;
selecting a BVSP candidate from the merge candidate; and
setting a reference index of the BVSP candidate to refer to the reference picture.

20. The method of claim 14, further comprising, when encoding a co-located block to the block, enabling motion parameter inheritance.

21. The method of claim 14, further comprising:
entropy encoding the value of the reference index;
calculating a residual block for the block representing pixel-by-pixel differences between the block and the BVSP reference block;
transforming the residual block to produce transform coefficients;
quantizing the transform coefficients; and
entropy encoding the quantized transform coefficients.

22. A device for coding video data, the device comprising:
a memory storing a reference picture; and
a video coder configured to:
  determine a reference index that identifies the reference picture in a reference picture list for a block of multiview video data, the reference picture comprising a source for backward-warping view synthesis prediction (BVSP), the reference index comprising an index into the reference picture list, wherein to determine the reference index, the video coder is configured to:
    when an ordinal first reference picture of the reference picture list is a long-term reference picture, set the reference index equal to zero to identify the ordinal first reference picture; and
    when the ordinal first reference picture of the reference picture list is a short-term reference picture, set the reference index equal to a non-zero value of an index of a long-term reference picture in the reference picture list,
  determine a position of the reference picture in the reference picture list as corresponding to a value of the index into the reference picture list,
  perform BVSP on a portion of the reference picture identified by the reference index to produce a BVSP reference block, and
  predict the block using the BVSP reference block.

23. The device of claim 22, wherein the block is included in a current view, wherein the reference picture is included in a first reference view different from the current view, and wherein the video coder is configured to perform BVSP to produce the BVSP reference block in a second reference view that is different from the first reference view and the current view.

24. The device of claim 22, wherein the video coder is configured to, when coding motion information for a different block using temporal motion vector prediction (TMVP) relative to the block, access the motion information of the block using a function that is also used to access motion information for inter-view predicted blocks.

25. The device of claim 22, wherein the video coder is configured to deblock edges of the block without regard for whether the block was coded using BVSP.

26. The device of claim 21, wherein the video coder is configured to code motion information of the block using merge mode, and wherein to use merge mode, the video coder is configured to create a merge candidate list, select a BVSP candidate from the merge candidate, and, immediately after creating the merge candidate list and selecting the BVSP candidate, setting a value for the reference index of the block.

27. The device of claim 21, wherein the video coder is configured to code motion information of the block using merge mode, and wherein to use merge mode, the video coder is configured to create a merge candidate list, select a BVSP candidate from the merge candidate, and set a reference index of the BVSP candidate to refer to the reference picture.

28. The device of claim 21, further comprising a memory including a decoded picture buffer (DPB) that stores the reference picture, wherein the video coder is configured to prevent storing a variable indicating the use of BVSP for the block in the reference picture of the DPB.

29. The device of claim 21, wherein the video coder is configured to, when coding a co-located block to the block, enable motion parameter inheritance.

30. The device of claim 21, wherein the video coder comprises one of a video encoder and a video decoder.

31. The device of claim 21, wherein the device comprises at least one of:
  an integrated circuit;
  a microprocessor; and
  a wireless communication device.

32. A device for coding video data, the device comprising:
means for determining a reference index that identifies a reference picture in a reference picture list for a block of multiview video data, the reference picture comprising a source for backward-warping view synthesis prediction (BVSP), the reference index comprising an index into the reference picture list, wherein the means for determining the reference index comprises:
  means for setting the reference index equal to zero to identify the ordinal first reference picture when an ordinal first reference picture of the reference picture list is a long-term reference picture; and
  means for setting the reference index equal to a non-zero value of an index of a long-term reference picture in the reference picture list when the ordinal first reference picture of the reference picture list is a short-term reference picture;
means for determining a position of the reference picture in the reference picture list as corresponding to a value of the index into the reference picture list;
means for performing BVSP on a portion of the reference picture identified by the reference index to produce a BVSP reference block; and
means for predicting the block using the BVSP reference block.

33. The device of claim 32, wherein the block is included in a current view, wherein the reference picture is included in a first reference view different from the current view, and wherein performing BVSP comprises performing BVSP to produce the BVSP reference block in a second reference view that is different from the first reference view and the current view.

34. The device of claim 32, further comprising means for accessing, when coding motion information for a different block using temporal motion vector prediction (TMVP) relative to the block, the motion information of the block using a function that is also used to access motion information for inter-view predicted blocks.

35. The device of claim 32, further comprising means for deblocking edges of the block without regard for whether the block was coded using BVSP.

36. The device of claim 32, further comprising means for coding motion information of the block using merge mode, comprising:
  means for creating a merge candidate list;
  means for selecting a BVSP candidate from the merge candidate; and
  means for setting, immediately after creating the merge candidate list and selecting the BVSP candidate, a value for the reference index of the block.

37. The device of claim 32, further comprising means for coding motion information of the block using merge mode, comprising:
  means for creating a merge candidate list;
  means for selecting a BVSP candidate from the merge candidate; and
  means for setting a reference index of the BVSP candidate to refer to the reference picture.

38. The device of claim 32, wherein the reference picture is stored in a decoded picture buffer (DPB), further comprising means for preventing storing a variable indicating the use of BVSP for the block in the reference picture of the DPB.

39. The device of claim 32, further comprising means for enabling, when coding a co-located block to the block, motion parameter inheritance.

40. A non-transitory computer-readable storage medium having stored thereon instructions that, when executed, cause a processor of a device for coding video data to:
  determine a reference index that identifies a reference picture in a reference picture list for a block of multi-view video data, the reference picture comprising a source for backward-warping view synthesis prediction (BVSP), the reference index comprising an index into the reference picture list, wherein the instructions that cause the processor to determine the reference index comprise instructions that cause the processor to:
    when an ordinal first reference picture of the reference picture list is a long-term reference picture, set the reference index equal to zero to identify the ordinal first reference picture; and
    when the ordinal first reference picture of the reference picture list is a short-term reference picture, set the reference index equal to a non-zero value of an index of a long-term reference picture in the reference picture list;
  determine a position of the reference picture in the reference picture list as corresponding to a value of the index into the reference picture list;
  perform BVSP on a portion of the reference picture identified by the reference index to produce a BVSP reference block; and
  predict the block using the BVSP reference block.

41. The non-transitory computer-readable storage medium of claim 40, wherein the block is included in a current view, wherein the reference picture is included in a first reference view different from the current view, and wherein the instructions that cause the processor to perform BVSP comprise instructions that cause the processor to perform BVSP to produce the BVSP reference block in a second reference view that is different from the first reference view and the current view.

42. The non-transitory computer-readable storage medium of claim 40, further comprising instructions that cause the processor to, when coding motion information for a different block using temporal motion vector prediction (TMVP) relative to the block, access the motion information of the block using a function that is also used to access motion information for inter-view predicted blocks.

43. The non-transitory computer-readable storage medium of claim 40, further comprising instructions that cause the processor to deblock edges of the block without regard for whether the block was coded using BVSP.

44. The non-transitory computer-readable storage medium of claim 40, further comprising instructions that cause the processor to code motion information of the block using merge mode, comprising instructions that cause the processor to:
  create a merge candidate list;
  select a BVSP candidate from the merge candidate; and
  immediately after creating the merge candidate list and selecting the BVSP candidate, set a value for the reference index of the block.

45. The non-transitory computer-readable storage medium of claim 40, further comprising instructions that cause the processor to code motion information of the block using merge mode, comprising instructions that cause the processor to:
  create a merge candidate list;
  select a BVSP candidate from the merge candidate; and
  set a reference index of the BVSP candidate to refer to the reference picture.

46. The non-transitory computer-readable storage medium of claim 40, wherein the reference picture is stored in a decoded picture buffer (DPB), further comprising instructions that cause the processor to prevent storing a variable indicating the use of BVSP for the block in the reference picture of the DPB.

47. The non-transitory computer-readable storage medium of claim 40, further comprising instructions that cause the processor to, when coding a co-located block to the block, enable motion parameter inheritance.

* * * * *